(12) United States Patent
Okamura

(10) Patent No.: US 11,887,373 B2
(45) Date of Patent: *Jan. 30, 2024

(54) SALES MANAGEMENT SYSTEM AND SALES MANAGEMENT METHOD

(71) Applicant: TOSHIBA TEC KABUSHIKI KAISHA, Tokyo (JP)

(72) Inventor: Atsushi Okamura, Mishima Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/892,599

(22) Filed: Aug. 22, 2022

(65) Prior Publication Data
US 2022/0398849 A1 Dec. 15, 2022

Related U.S. Application Data

(63) Continuation of application No. 16/898,387, filed on Jun. 10, 2020, now Pat. No. 11,455,803.

(30) Foreign Application Priority Data

Sep. 5, 2019 (JP) ................. 2019-162003

(51) Int. Cl.
G06V 40/20 (2022.01)
G06V 20/52 (2022.01)
G07C 9/32 (2020.01)

(52) U.S. Cl.
CPC ............. G06V 20/52 (2022.01); G06V 40/20 (2022.01); G07C 9/32 (2020.01)

(58) Field of Classification Search
CPC ........ G06Q 20/20; G07C 9/32; G07G 1/0036; G06V 20/52; G06V 40/20; G06F 19/784; G06F 16/7335
See application file for complete search history.

(56) References Cited

U.S. PATENT DOCUMENTS 7,780,081 B1   8/2010 Liang
9,984,354 B1   5/2018 Chinoy et al.
(Continued)

FOREIGN PATENT DOCUMENTS

EP   2109076 A1   10/2009
JP   2014-106628 A   6/2014
(Continued)

OTHER PUBLICATIONS

Extended European Search Report dated Jan. 27, 2021 in corresponding European Patent Application No. 20187824.6, 8 pages.
(Continued)

Primary Examiner — Syed Haider
(74) Attorney, Agent, or Firm — Kim & Stewart LLP

(57) ABSTRACT

A sales management system includes a first device including a first processor that is configured to detect a customer moving an item of merchandise in an extraction direction away from a merchandise display, a second device including a second processor that is configured to detect movement of an item of merchandise from the merchandise display and determine a movement direction thereof, and a third processor that is configured to determine whether the extraction and movement directions are substantially identical when the first processor detects the customer moving an item away from the merchandise display and the second processor detects movement of an item from the merchandise display at substantially the same time, and determine the item as a first merchandise to be purchased by the customer when the extraction and movement directions are determined to be the substantially identical.

20 Claims, 16 Drawing Sheets

(56) References Cited

U.S. PATENT DOCUMENTS

| | | |
|---|---|---|
| 10,121,133 B2 | 11/2018 | Nelms et al. |
| 2002/0178085 A1 | 11/2002 | Sorensen |
| 2011/0199486 A1* | 8/2011 | Moriya .................. G06Q 30/02 |
| | | 348/150 |
| 2013/0054310 A1* | 2/2013 | Sickenius .............. G06Q 30/02 |
| | | 705/7.39 |
| 2015/0029339 A1 | 1/2015 | Kobres et al. |
| 2015/0039458 A1* | 2/2015 | Reid ...................... A61B 5/117 |
| | | 705/26.1 |
| 2019/0096209 A1* | 3/2019 | Chen .................. G08B 13/2454 |
| 2020/0193148 A1 | 6/2020 | He et al. |
| 2020/0202683 A1 | 6/2020 | Gao et al. |
| 2020/0258041 A1 | 8/2020 | Fujisawa |
| 2020/0364752 A1* | 11/2020 | Okamoto ............ G06F 3/03547 |

FOREIGN PATENT DOCUMENTS

| | | |
|---|---|---|
| WO | 02/093306 A2 | 11/2002 |
| WO | 2019/038968 A1 | 2/2019 |

OTHER PUBLICATIONS

Office action dated Jul. 28, 2022 in corresponding European Patent Application No. 20187824.6, 7 pages.

* cited by examiner

SALES MANAGEMENT SYSTEM AND SALES MANAGEMENT METHOD

CROSS-REFERENCE TO RELATED APPLICATION

This application is a continuation of U.S. patent application Ser. No. 16/898,387, filed Jun. 10, 2022, which is based upon and claims the benefit of priority from Japanese Patent Application No. 2019-162003, filed Sep. 5, 2019, the entire contents of which are incorporated herein by reference.

FIELD

The embodiment relates to a sales management system and a sales management method.

BACKGROUND

Various sales management systems have been devised to enable merchandise at cashier-less stores to be sold to customers without involvement of clerks.

For example, a sales management system detects that a customer selects or takes an item being sold at the store using an image of the inside of the store obtained by a camera. The sales management system registers the merchandise item detected as being taken by the customer as an item being purchased by the customer.

However, in such a sales management system, if, for example, two customers are standing in front of a merchandise display and both extend their arms towards the merchandise display almost simultaneously, but only one of the customers actually takes an item from the merchandise display, it may be difficult to determine which customer has actually selected the merchandise item for purchase.

DETAILED DESCRIPTION

According to an embodiment, a sales management system comprises a first device including a first processor that is configured to detect a customer moving an item of merchandise in an extraction direction away from a merchandise display, a second device including a second processor that is configured to detect movement of an item of merchandise from the merchandise display and determine a movement direction thereof, and a third processor that is configured to determine whether the extraction and movement directions are substantially identical when the first processor detects the customer moving an item away from the merchandise display and the second processor detects movement of an item from the merchandise display at substantially the same time, and determine the item as a first merchandise to be purchased by the customer when the extraction and movement directions are determined to be the substantially identical.

Hereinafter, certain example embodiments of a sales management system and a sales management method that can correctly specify a customer who takes a merchandise in a cashier-less store or the like are described with reference to the drawings.

Figure 1:
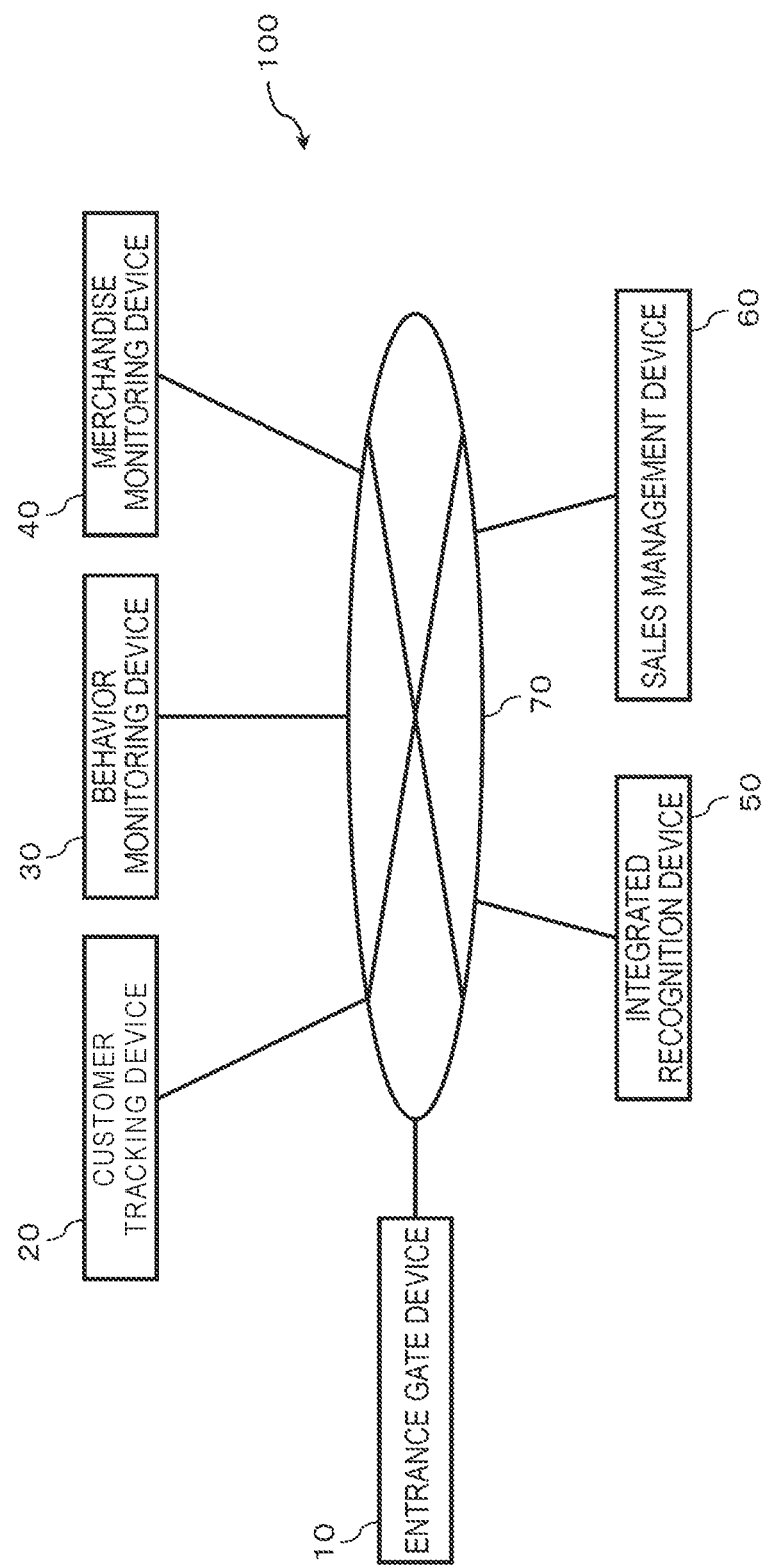
FIG. 1 is a schematic diagram illustrating a configuration of a sales management system according to an embodiment.

FIG. 1 is a schematic diagram of a sales management system 100 installed in a cashier-less store. The sales management system 100 includes an entrance gate device 10, a customer tracking device 20, a behavior monitoring device 30, a merchandise monitoring device 40, an integrated recognition device 50, and a sales management device 60. The sales management system 100 connects the entrance gate device 10, the customer tracking device 20, the behavior monitoring device 30, the merchandise monitoring device 40, the integrated recognition device 50, and the sales management device 60 described above via a communication network 70 for bidirectional communication. The communication network 70 is, for example, a local area network (LAN). The LAN may be a wired LAN or a wireless LAN.

The entrance gate device 10 is a device including a check-in function for accepting a customer entering the store and a gate function switching between an open state in which the customer can enter the store and a closed state in which the customer is prevented from entering the store. The sales management system 100 may include only one entrance gate device 10 or may include two or more entrance gate devices 10.

Figure 2:
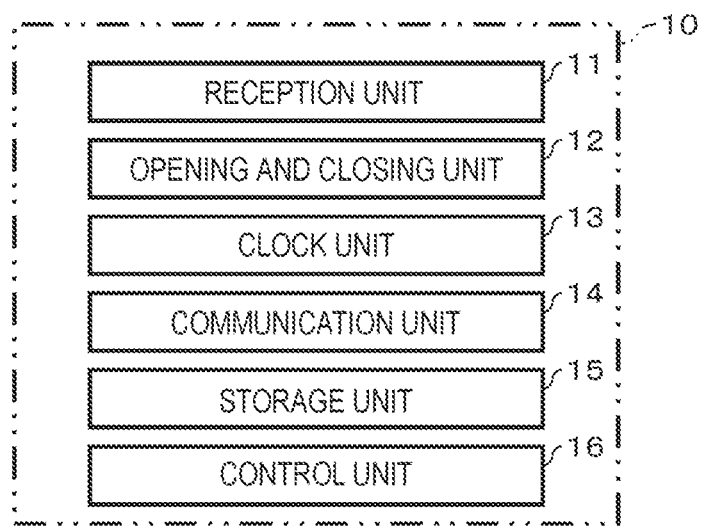
FIG. 2 is a block diagram illustrating a hardware configuration of an entrance gate device in a sales management system.

FIG. 2 is a block diagram illustrating a hardware configuration of the entrance gate device 10. The entrance gate device 10 includes a reception unit 11, an opening and closing unit 12, a clock unit 13, a communication unit 14, a storage unit 15, and a control unit 16. The entrance gate device 10 may include other hardware units.

The reception unit 11 is a device installed at the entrance of the store to accept check-in by the customer. The customer is registered as a member in advance when shopping at the store for the first time. By the member registration, a unique member ID is issued for the customer. The member ID is stored, for example, in an information terminal, such as a smartphone, owned by the customer. When a dedicated application program starts on the information terminal, a barcode or a two-dimensional code (e.g., a QR code or the like) indicating the member ID is displayed on the display of the information terminal. In this case, the reception unit 11 is a scanner for scanning the barcode or the two-dimensional code displayed on the display. In other examples, a signal indicating the member ID may be transmitted from the information terminal by short range wireless communication using a technology such as radio frequency identification (RFID) or the like. In such a case, the reception unit 11 can be an RFID reader, a near-field communication (NFC) device or the like having an antenna. In some examples, the member ID may be recorded on an IC card, a magnetic card, or the like and issued to the customer. In this case, the reception unit 11 can be a card reader for reading the IC card, the magnetic card, or the like.

The opening and closing unit 12 is a device that controls the opening and closing of the gate provided at the entrance of the store. When the gate is closed, entry is prevented. When the gate is open, entry is permitted. The opening and closing unit 12 usually maintains the gate in a closed position. When the check-in is approved by the reception unit 11, the opening and closing unit 12 temporarily opens the gate to permit entry. The opening and closing unit 12 includes a sensor for detecting a customer passing through the gate.

The clock unit 13 provides current date and time. When a customer enters the gate, the entrance gate device 10 acquires the date and time provided by the clock unit 13 and records them as the entry date and time of the customer.

The communication unit 14 is connected to the communication network 70. The communication unit 14 performs data communication with the customer tracking device 20, the behavior monitoring device 30, the merchandise monitoring device 40, the integrated recognition device 50, and the sales management device 60 via the communication network 70 according to a particular communication protocol.

The storage unit 15 includes a non-volatile memory area and a volatile memory area. The storage unit 15 stores control programs in the non-volatile memory area for controlling operations as the entrance gate device 10. The storage unit 15 stores data in the volatile memory area required for operation as the entrance gate device 10. The non-volatile memory area is, for example, a read only memory (ROM). The volatile memory area is, for example, a random access memory (RAM).

The control unit 16 performs a function as the entrance gate device 10 by respectively controlling the reception unit 11, the opening and closing unit 12, the clock unit 13, and the communication unit 14 according to the control programs. For example, the control unit 16 is a central processing unit (CPU) or other processor. In the entrance gate device 10, the control unit 16 and the storage unit 15 make up a controller for controlling operations of the opening and closing unit 12.

The customer tracking device 20 is a device for tracking a location of a customer who has entered the store via the entrance gate until he or she leaves the store via an exit.

Figure 3:
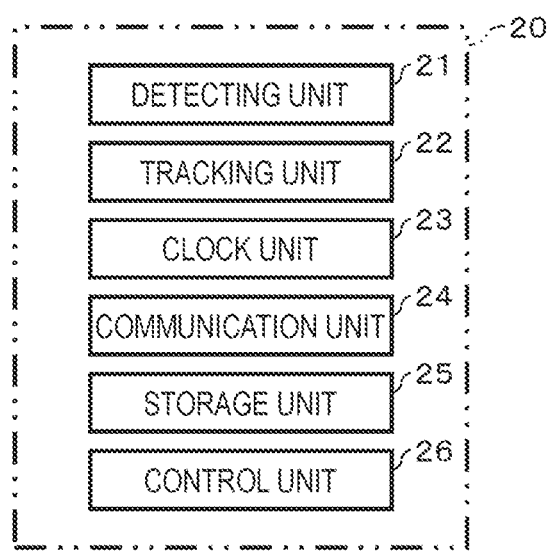
FIG. 3 is a block diagram illustrating a hardware configuration of a customer tracking device in a sales management system.

FIG. 3 is a block diagram illustrating a hardware configuration of the customer tracking device 20. The customer tracking device 20 includes a detection unit 21, a tracking unit 22, a clock unit 23, a communication unit 24, a storage unit 25, and a control unit 26. The customer tracking device 20 may include other hardware units.

The detection unit 21 detects positions of a plurality of customers in the store by using the output from a plurality of sensors disposed in the store. The sensors are mounted, for example, on the ceiling of the store. A sensor may be provided, for example, along a customer passage in the store. As a sensor, any known camera sensor, such as an optical camera, an infrared camera, a time of flight (TOF) camera, a stereo camera, or the like can be used. In some examples, beacon terminals that transmit IDs by radio waves may be disposed in various places in the store, and the positions of the customers may be detected in combination with a smartphone owned by the customer and configured to communicate with the beacon terminals.

The tracking unit 22 tracks each customer based on the position information of each customer detected by the detection unit 21. For example, for each of the customers whose check-in is approved by the entrance gate device 10, the tracking unit 22 collects and stores tracking data including the position information and the detected date and time of the customer in a chronological order to track the location of each customer during shopping.

The clock unit 23 provides current date and time. The customer tracking device 20 acquires the date and time provided by the clock unit 23 and records them together with the detected location of each customer.

The communication unit 24 is connected to the communication network 70. The communication unit 24 performs data communication with the entrance gate device 10, the behavior monitoring device 30, the merchandise monitoring device 40, the integrated recognition device 50, and the sales management device 60 via the communication network 70 according to a particular communication protocol.

The storage unit 25 includes a non-volatile memory area and a volatile memory area. The storage unit 25 stores control programs for controlling an operation as the customer tracking device 20 in the non-volatile memory area. The storage unit 25 stores data required for an operation as the customer tracking device 20 in the volatile memory area. The non-volatile memory area is, for example, a ROM. The volatile memory area is, for example, a RAM.

The control unit 26 realizes a function as the customer tracking device 20 by respectively controlling the detection unit 21, the tracking unit 22, the clock unit 23, and the communication unit 24 according to the control programs. For example, the control unit 26 is a CPU. In the customer tracking device 20, the control unit 26 and the storage unit 25 make up a controller to control operations of the customer tracking device 20.

The behavior monitoring device 30 is a device for monitoring behaviors of each customer facing a merchandise display or the like. The behavior monitoring device 30 monitors whether there is a behavior corresponding to grasping and extracting the displayed merchandise by a customer who became a monitoring target by standing at the place where the merchandise is displayed, for example, in front of a merchandise shelf. When there is such a behavior, the action monitoring device 30 specifies the extraction direction of the merchandise. In the sales management system 100, typically one behavior monitoring device 30 is disposed on each merchandise shelf or the like. However, in some examples of the sales management system 100, one behavior monitoring device 30 may be disposed for monitoring a plurality of merchandise shelves. For all merchandise shelves in the store, whether there is a behavior of extracting a merchandise from the merchandise shelves by the customer is monitored. In general, as long as the behavior can be detected and the extraction direction of the merchandise can be specified, any number of behavior monitoring devices 30 may be used.

Figure 4:
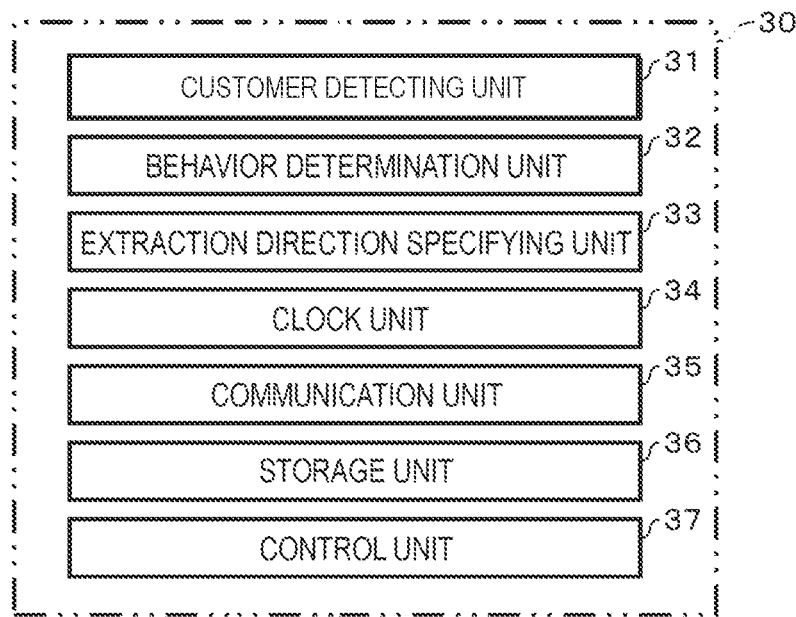
FIG. 4 is a block diagram illustrating a hardware configuration of a behavior monitoring device in a sales management system.

FIG. 4 is a block diagram illustrating a hardware configuration of the behavior monitoring device 30. The behavior monitoring device 30 includes a customer detection unit 31, a behavior determination unit 32, an extraction direction specifying unit 33, a clock unit 34, a communication unit 35, a storage unit 36, and a control unit 37. The behavior monitoring device 30 may include other hardware units.

The customer detection unit 31 detects a customer facing a displayed merchandise by a sensor disposed in the store, mainly near the merchandise shelf. The customer detection unit 31 sets a section having a predetermined width on the floor in front of the merchandise shelf, as a monitoring target area. The customer detection unit 31 detects a customer in the monitoring target area. The customer detection unit 31 can simultaneously detect a plurality of customers present in the monitoring target area. As the sensor, a camera sensor such as an optical camera, an infrared camera, a TOF camera, a stereo camera, or the like can be used. The customer detection unit 31 may use the sensor used by the detection unit 21 of the customer tracking device 20.

The behavior determination unit 32 determines a behavior of the customer detected by the customer detection unit 31. The behavior determination unit 32 determines whether the customer moves out from the monitoring target area. The behavior determination unit 32 determines whether the customer performs a specific behavior, e.g., grasping and extracting a displayed merchandise. When a plurality of customers are detected by the customer detection unit 31, the behavior determination unit 32 determines the behavior of each of the customers. The behavior determination unit 32 can determine whether there is such a behavior by using the sensor used in the customer detection unit 31. The behavior determination unit 32 may determine whether there is such a behavior by using other sensors.

When the behavior determination unit 32 detects the behavior of grasping and extracting a displayed merchandise, the extraction direction specifying unit 33 specifies the extraction direction of the merchandise. The extraction direction specifying unit 33 can specify the extraction direction, for example, by using the sensor used in the customer detection unit 31. The extraction direction specifying unit 33 may specify the extraction direction by using other sensors.

The clock unit 34 provides date and time. The behavior monitoring device 30 acquires the date and time provided by the clock unit 34 and records them when the behavior of grasping and extracting the merchandise is detected.

The communication unit 35 is connected to the communication network 70. The communication unit 35 performs data communication with the entrance gate device 10, the customer tracking device 20, the merchandise monitoring device 40, the integrated recognition device 50, and the sales management device 60 via the communication network 70 according to the particular communication protocol.

The storage unit 36 includes a non-volatile memory area and a volatile memory area. The storage unit 36 stores control programs for controlling an operation as the behavior monitoring device 30 in the non-volatile memory area. The storage unit 36 stores data required for the operation as the behavior monitoring device 30 in the volatile memory area. The non-volatile memory area is, for example, a ROM. The volatile memory area is, for example, a RAM.

The control unit 37 performs a function as the behavior monitoring device 30 by respectively controlling the customer detection unit 31, the behavior determination unit 32, the extraction direction specifying unit 33, the clock unit 34, and the communication unit 35 according to the control programs. For example, the control unit 37 is a CPU. In the behavior monitoring device 30, the control unit 37 and the storage unit 36 make up a controller to control operations of the behavior monitoring device 30.

The merchandise monitoring device 40 is a device for monitoring the movement of a displayed merchandise. The merchandise monitoring device 40 identifies an item of merchandise being lifted from the merchandise shelf and also identifies the movement direction when an item of merchandise is taken out from the merchandise shelf by a customer. In the sales management system 100, typically, one merchandise monitoring device 40 is disposed on one merchandise shelf. However, in some examples of the sales management system 100, one merchandise monitoring device 40 may be disposed for monitoring a plurality of merchandise shelves. In general, as long as all items of merchandise extracted from each merchandise shelf can be specified and the movement direction of each item of merchandise can be specified, any number of merchandise monitoring devices 40 may be used.

Figure 5:
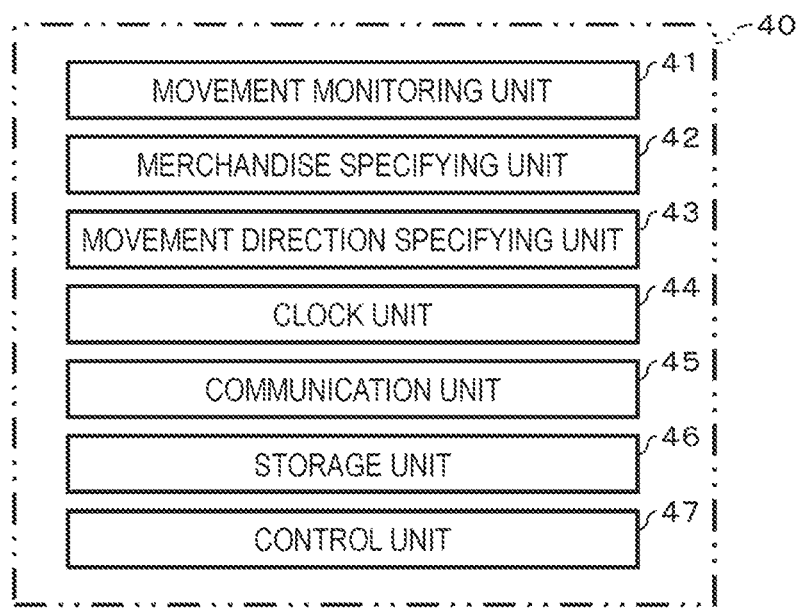
FIG. 5 is a block diagram illustrating a hardware configuration of a merchandise monitoring device in a sales management system.

FIG. 5 is a block diagram illustrating a hardware configuration of the merchandise monitoring device 40. The merchandise monitoring device 40 includes a movement monitoring unit 41, a merchandise specifying unit 42, a movement direction specifying unit 43, a clock unit 44, a communication unit 45, a storage unit 46, and a control unit 47. The merchandise monitoring device 40 may include other hardware units.

The movement monitoring unit 41 monitors the movement of displayed merchandise by using the sensor disposed on or near a merchandise shelf. As the sensor, a camera sensor such as an optical camera, an infrared camera, a TOF camera, a stereo camera, or the like can be used. In some examples, a camera sensor and a weight sensor and/or a distance measuring sensor may be combined to monitor the merchandise and detect the movement.

The merchandise specifying unit 42 identifies the merchandise for which the movement has been detected by the movement monitoring unit 41 and the number thereof. The merchandise specifying unit 42 can specify the moved merchandise, for example, by using the sensor used by the movement monitoring unit 41. The merchandise specifying unit 42 may also or instead identify the moved merchandise by using other sensors.

The movement direction specifying unit 43 identifies the movement direction of the merchandise of which the movement is detected by the movement monitoring unit 41. The movement direction specifying unit 43 can specify the movement direction, for example, by using the sensor used in the movement monitoring unit 41. The movement direction specifying unit 43 may specify the movement direction by using other sensors.

The clock unit 44 provides current date and time. The merchandise monitoring device 40 acquires the date and time provided by the clock unit 44 and records them when the movement of the merchandise is detected.

The communication unit 45 is connected to the communication network 70. The communication unit 45 performs data communication with the entrance gate device 10, the customer tracking device 20, the behavior monitoring device 30, the integrated recognition device 50, and the sales management device 60 via the communication network 70 according to the particular communication protocol.

The storage unit 46 includes a non-volatile memory area and a volatile memory area. The storage unit 46 stores control programs for controlling an operation as the merchandise monitoring device 40 in the non-volatile memory area. The storage unit 46 stores data required for an operation as the merchandise monitoring device 40 in the volatile memory area. The non-volatile memory area is, for example, a ROM. The volatile memory area is, for example, a RAM.

The control unit 47 realizes a function as the merchandise monitoring device 40 by respectively controlling the movement monitoring unit 41, the merchandise specifying unit 42, the movement direction specifying unit 43, the clock unit 44, and the communication unit 45 according to the control programs. The control unit 47 is a CPU. In the merchandise monitoring device 40, the control unit 47 and the storage unit 46 make up a controller to control operations of the merchandise monitoring device 40.

Here, an example of a merchandise shelf 80 to which the behavior monitoring device 30 and the merchandise monitoring device 40 are applied is described with reference to FIGS. 6 to 8.

Figure 6:
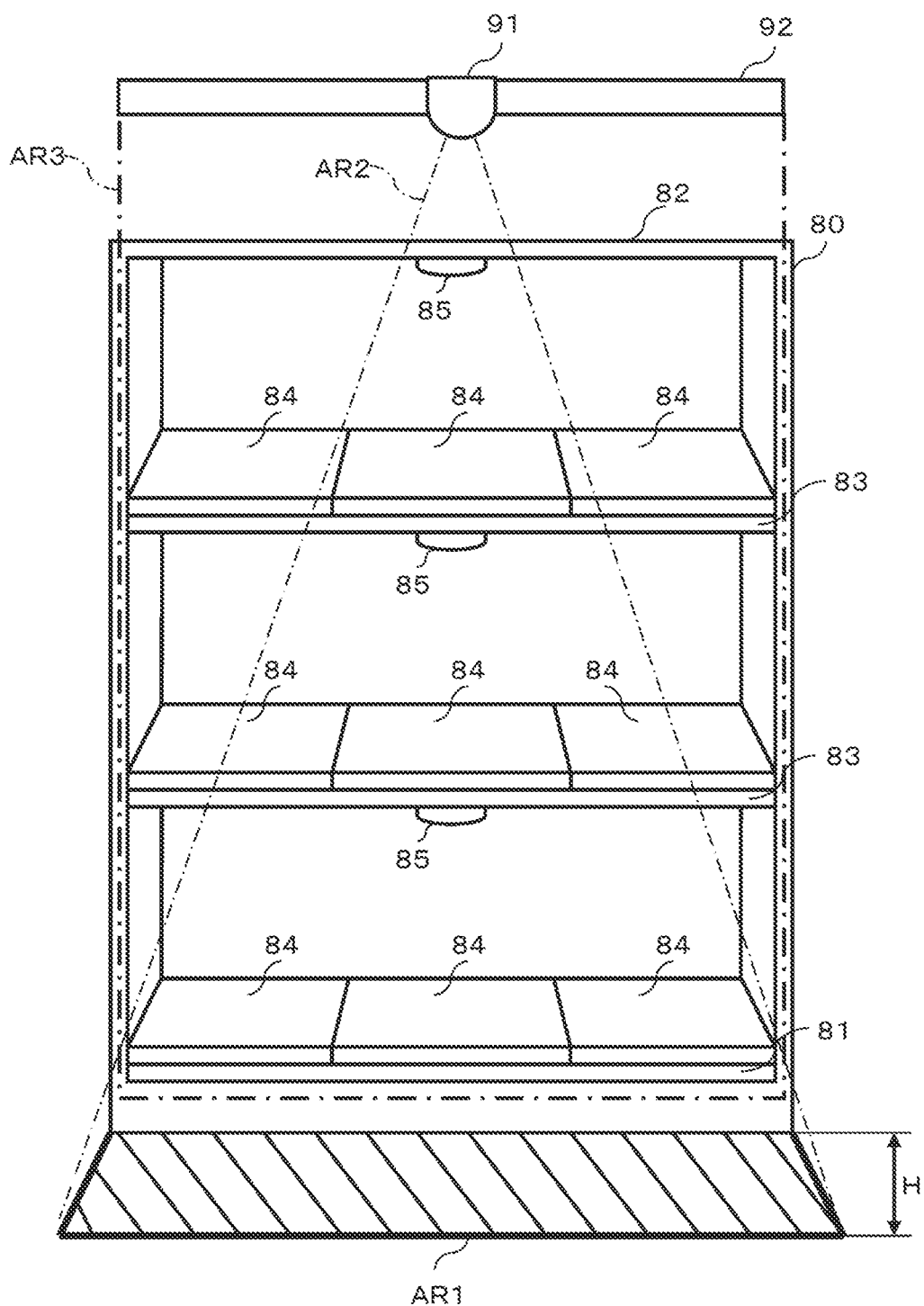
FIG. 6 is a schematic diagram of a front view of a merchandise shelf for which a behavior monitoring device and a merchandise monitoring device are provided.
Figure 7:
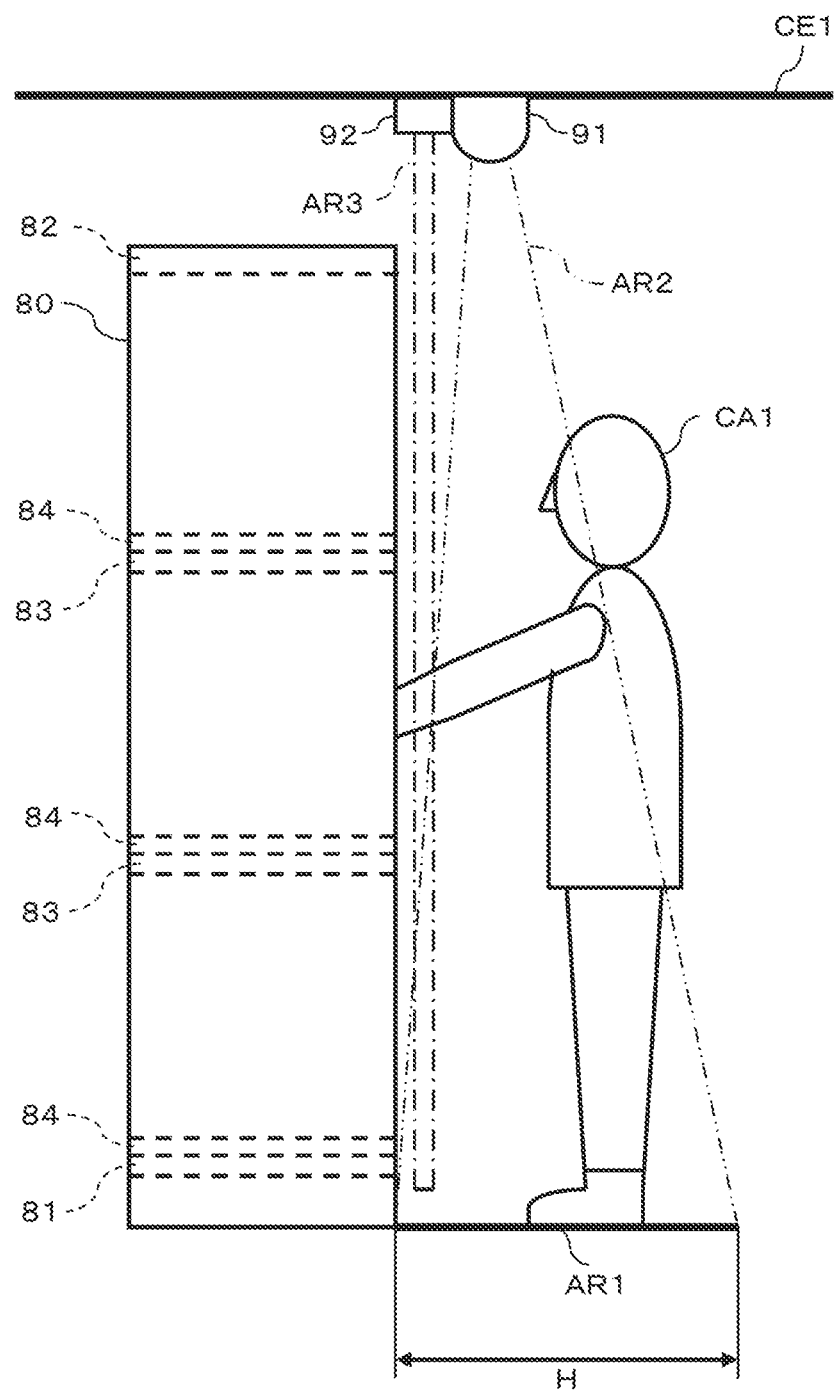
FIG. 7 is a schematic diagram of a side view of the merchandise shelf.

FIG. 6 is a schematic diagram of the merchandise shelf 80 as viewed from the front side, and FIG. 7 is a schematic diagram of the merchandise shelf 80 as viewed from one side. FIGS. 6 and 7 illustrate a merchandise shelf 80 of a three-stage configuration in which a space between a bottom plate 81 and a top plate 82 is partitioned by two shelf plates 83. Each stage is divided into three sections: left, right, and center. Each section displays one kind of merchandise.

A weight sensor 84 is disposed for each section where one or more merchandises are displayed. The weight sensor 84 measures the total weight of the merchandises displayed in the section. The camera sensor 85 is mounted for each stage. The camera sensor 85 is, for example, an optical camera or an infrared camera and monitors the merchandise displayed on each stage. As long as the merchandise can be monitored, the mounting position of the camera sensor is not particularly limited. FIG. 6 illustrates an example in which one camera sensor 85 is disposed for each stage, but the number of camera sensors 85 is not particularly limited. For example, the camera sensor 85 may be disposed for each section of each stage.

The side on which the merchandises are put into and taken out of the merchandise shelf 80 is called the front side. In the present embodiment, as illustrated in FIGS. 6 and 7, an area on the floor having a width H from the edge of the merchandise shelf 80 on the front side is set as a monitoring target area AR1. A camera sensor 91 for detecting a customer CA1 positioned in the monitoring target area AR1 is mounted above the merchandise shelf 80, for example, on a ceiling CE1. Desirably, the camera sensor 91 is mounted at a position where the customer CA1 can be imaged diagonally from above. The camera sensor 91 detects that the customer CA1 is present in the monitoring target area AR1 when, for example, the head of the customer CA1 is located in an imaging area AR2. For example, when two heads are located in the imaging area AR2, the camera sensor 91 detects that two customers CA1s are present in the monitoring target area AR1. The camera sensor 91 is a TOF camera, a stereo camera, or a 2D camera. By using a TOF camera, a stereo camera, or a 2D camera as the camera sensor 91, the physical size of the customer CA1 positioned in the monitoring target area AR1 can be estimated, and the behavior of the customer CA1 can be detected based on the estimated physical size. Specifically, a behavior of extending the arm toward the merchandise shelf 80 or a behavior of withdrawing a merchandise from the merchandise shelf 80 by the customer CA1 can be detected. It is possible to detect in which direction the arm extends from the front of the merchandise shelf toward the merchandise shelf or in which direction the arm is returned. The front side is the side on which the merchandise is taken out of and put into the merchandise shelf 80.

In the present embodiment, as illustrated in FIG. 7, the front side of the merchandise shelf 80 is set as a screen-like behavior monitoring area AR3. As illustrated in FIG. 6, the behavior monitoring area AR3 is formed so as to cover the surface on the front side of the merchandise shelf 80. Then, a camera sensor 92 for detecting a behavior of the customer with respect to the behavior monitoring area AR3 is mounted on, for example, the ceiling CE1. The camera sensor 92 is a TOF camera or a stereo camera. The camera sensor 92 detects an arm that enters or leaves the behavior monitoring area AR3.

Here, the camera sensor 91 is a sensor used by the customer detection unit 31 of the behavior monitoring device 30. The camera sensor 91 and the camera sensor 92 are sensors used by the behavior determination unit 32 and the extraction direction specifying unit 33 of the behavior monitoring device 30. That is, by combining information acquired from the camera sensor 91 and the camera sensor 92, the direction in which the merchandise is extracted can be more correctly detected. The camera sensor 85 is a sensor used by the movement monitoring unit 41 and the movement direction specifying unit 43 of the merchandise monitoring device 40. The weight sensors 84 are sensors used by the movement monitoring unit 41 and the merchandise specifying unit 42 of the merchandise monitoring device 40.

As described above, the weight sensors 84 measures a total weight of the merchandises displayed in the section in which the weight sensors 84 is disposed, and one kind of merchandise is displayed in the section. Therefore, for example, with respect to the weight sensors 84 in a section in which a merchandise AAA having a weight per one unit W0 is displayed, when a measured weight is reduced from W2 to W1, a quotient obtained by dividing the reduced weight $\Delta W$ (W2−W1) by the unit weight W0 becomes the number of merchandises AAA taken from the section. In this manner, the movement monitoring unit 41 can recognize the movement of the displayed merchandises by the reduction of the weight measured by the weight sensors 84, and thus the merchandise specifying unit 42 can specify the kind and the number of the moved merchandises by the reduction of the measured weight by an integer multiple of the weight per merchandise.

Here, the timing of detecting the movement of the merchandise by the movement monitoring unit 41 and the timing of specifying the merchandise by the merchandise specifying unit 42 deviate from each other. By the characteristics of the weight sensors 84, there is a delay from the actual start of the movement of the merchandise until the detection of the movement of the merchandise.

Figure 8:
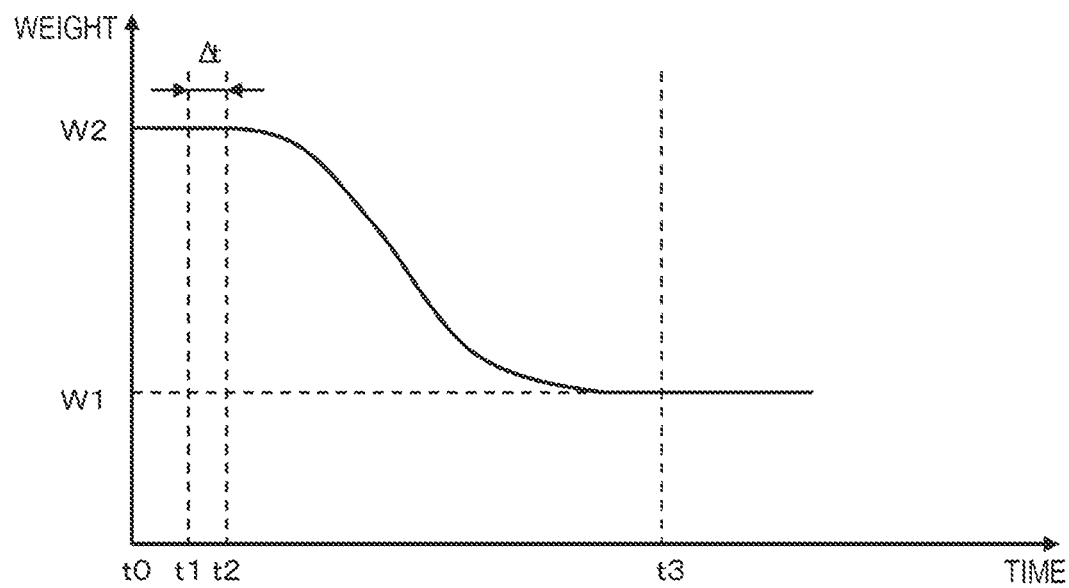
FIG. 8 is a graph for describing characteristics of a weight sensor provided on a merchandise shelf.

FIG. 8 is a graph for describing the characteristics of the weight sensors 84. In FIG. 8, the vertical axis indicates the weight measured by the weight sensor 84, and the horizontal axis indicates the passage of time. At a timing t0, the weight sensor 84 measures a weight W2. Thereafter, it is assumed that, at a timing t1, the merchandise in the section in which the weight sensors 84 is disposed is lifted, that is, the movement of the merchandise is started. In this case, the measured weight of the weight sensors 84 starts to reduce at a timing t2 when a certain delay time $\Delta t$ is passed. Accordingly, the movement monitoring unit 41 can detect the movement of the merchandise at the timing t2. Thereafter, at a timing t3 when the reduction of the measured weight to W1 is detected, the merchandise specifying unit 42 can specify the kind of the moved merchandise and the number thereof. In this manner, the timing t2 when the movement of the merchandise is detected in the movement monitoring unit 41 and the timing t3 when the moved merchandise and the number thereof are specified in the merchandise specifying unit 42 are deviate from each other. The timing t1 when the actual movement of the merchandise starts and the timing t2 when the movement of the merchandise is detected in the movement monitoring unit 41 are deviate from each other.

The integrated recognition device 50 is a device for correlating a customer specified by the behavior monitoring device 30 and a merchandise specified by the merchandise monitoring device 40.

Figure 9:
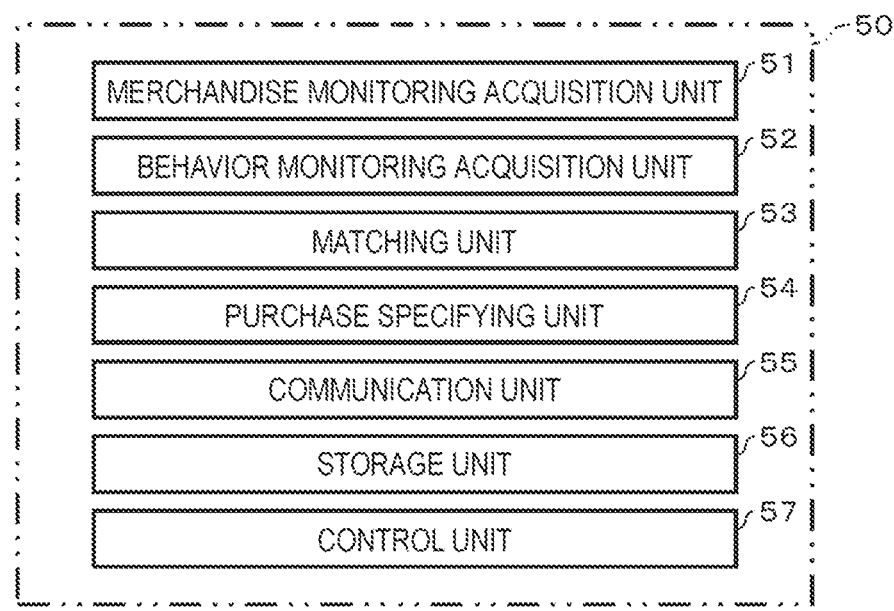
FIG. 9 is a block diagram illustrating a hardware configuration of an integrated recognition device in a sales management system.

FIG. 9 is a block diagram illustrating a hardware configuration of the integrated recognition device 50. The integrated recognition device 50 includes a merchandise monitoring acquisition unit 51, a behavior monitoring acquisition unit 52, a matching unit 53, a purchase specifying unit 54, a communication unit 55, a storage unit 56, and a control unit 57. The integrated recognition device 50 may include other hardware units.

The merchandise monitoring acquisition unit 51 acquires extracted merchandise information from the merchandise monitoring device 40. The extracted merchandise information is described below.

When the merchandise monitoring acquisition unit 51 acquires the extracted merchandise information from the merchandise monitoring device 40, the behavior monitoring acquisition unit 52 acquires customer extraction information from the behavior monitoring device 30 that monitors the behavior of the customer standing in front of the merchandise shelf monitored by the merchandise monitoring device 40. The customer extraction information is described below.

The matching unit 53 matches the extracted merchandise information acquired by the merchandise monitoring acquisition unit 51 and the customer extraction information acquired by the behavior monitoring acquisition unit 52.

The purchase specifying unit 54 specifies a customer who buys the merchandise and the merchandise bought by the customer based on the matching result by the matching unit 53.

The communication unit 55 is connected to the communication network 70. The communication unit 55 performs the data communication with the entrance gate device 10, the customer tracking device 20, the behavior monitoring device 30, the merchandise monitoring device 40, and the sales management device 60 via the communication network 70 according to the particular communication protocol.

The storage unit 56 includes a non-volatile memory area and a volatile memory area. The storage unit 56 stores control programs for controlling an operation as the integrated recognition device 50 in the non-volatile memory area. The storage unit 56 stores the data required for the operation as the integrated recognition device 50 in the volatile memory area. The non-volatile memory area is, for example, a ROM. The volatile memory area is, for example, a RAM.

The control unit 57 performs a function as the integrated recognition device 50 by respectively controlling the behavior monitoring acquisition unit 52, the merchandise monitoring acquisition unit 51, the matching unit 53, the purchase specifying unit 54, and the communication unit 55 according to the control programs. For example, the control unit 57 is a CPU. In the integrated recognition device 50, the control unit 57 and the storage unit 56 make up a controller to control operations of the integrated recognition device 50.

The sales management device 60 generates a list of merchandises bought by a customer and processes the payment by the customer based on the list. Hereinafter, this kind of list is called a purchase list.

Figure 10:
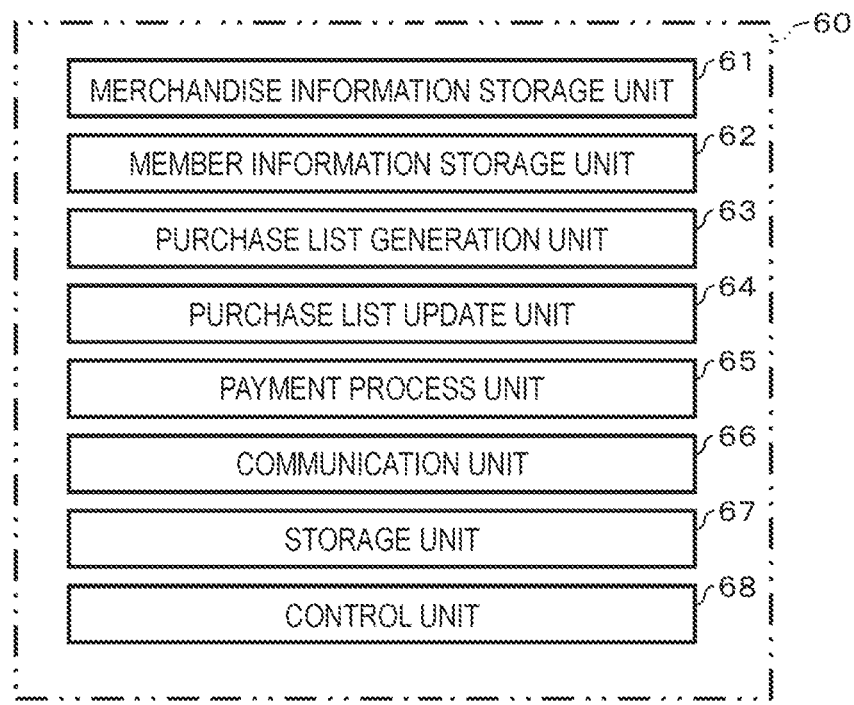
FIG. 10 is a block diagram illustrating a hardware configuration of a sales management device in a sales management system.

FIG. 10 is a block diagram illustrating a hardware configuration of the sales management device 60. The sales management device 60 includes a merchandise information storage unit 61, a member information storage unit 62, a purchase list generation unit 63, a purchase list update unit 64, a payment process unit 65, a communication unit 66, a storage unit 67, and a control unit 68. The sales management device 60 may include other hardware units.

The merchandise information storage unit 61 stores merchandise information such as a merchandise ID, the name of a merchandise, a price of each merchandise sold in the store, or the like. The merchandise ID is a unique identification code for identifying each merchandise.

The member information storage unit 62 stores member information such as a member ID, a validity date, a rejection flag, and a payment account of the customer who is registered as a member. The rejection flag is a one-bit data set for a member who cannot enter a store due to expiration of the membership, unauthorized use, or the like. The payment account is information on a saving account of a financial institution specified by the customer.

The merchandise information storage unit 61 and the member information storage unit 62 are formed in a storage device such as an electric erasable programmable read-only memory (EEPROM), a hard disk drive (HDD), or a solid state drive (SSD).

The purchase list generation unit 63 generates a purchase list 600 (refer to FIG. 11) for collecting and storing the merchandise ID of the merchandise bought by the customer and the number of purchases. The purchase list 600 is stored, for example, in a volatile memory area of the storage unit 67.

Figure 11:
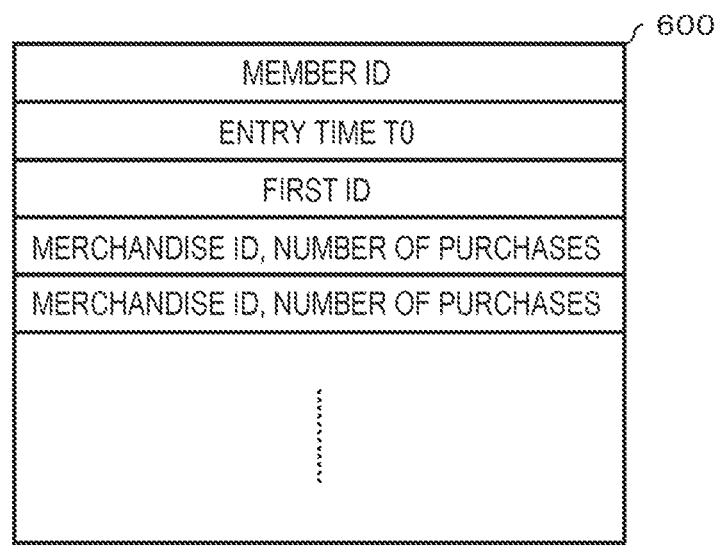
FIG. 11 is a schematic diagram illustrating a data structure of a purchase list generated by a sales management device.

FIG. 11 is a schematic diagram illustrating a data structure of the purchase list 600. As illustrated in FIG. 11, the purchase list 600 is correlated with the member ID and includes a field for storing an entry time T0, a first ID, and pair data of the plurality of merchandise IDs and the number of purchases. The entry time T0 and the first ID are explained in the description of operations described below.

The purchase list update unit 64 updates the purchase list 600 generated by the purchase list generation unit 63.

The payment process unit 65 processes a payment based on the data stored in the purchase list 600.

The communication unit 66 is connected to the communication network 70. The communication unit 66 performs data communication with the entrance gate device 10, the customer tracking device 20, the behavior monitoring device 30, the merchandise monitoring device 40, and the integrated recognition device 50 via the communication network 70 according to the particular communication protocol.

The storage unit 67 includes a non-volatile memory area and a volatile memory area. The storage unit 67 stores control programs for controlling an operation as the sales management device 60 in the non-volatile memory area. The storage unit 67 stores data required for the operation as the sales management device 60 in the volatile memory area. The non-volatile memory area is, for example, a ROM. The volatile memory area is, for example, a RAM.

The control unit 68 performs a function as the sales management device 60 by respectively controlling the merchandise information storage unit 61, the member information storage unit 62, the purchase list generation unit 63, the purchase list update unit 64, the payment process unit 65, and the communication unit 66 according to the control program. For example, the control unit 68 is a CPU. In the sales management device 60, the control unit 68 and the storage unit 67 make up a controller to control operations of the sales management device 60.

The hardware configurations of the sales management system 100 are as described above. As described above, the entrance gate device 10, the customer tracking device 20, the behavior monitoring device 30, and the merchandise monitoring device 40 have the clock units 13, 23, 34, and 44. These clock units 13, 23, 34, and 44 are synchronized. Alternatively, the clock units 13, 23, 34, and 44 may be a common external clock, which allows the control units 16, 26, 37, and 47 of the entrance gate device 10, the customer tracking device 20, the behavior monitoring device 30, and the merchandise monitoring device 40 to acquire the date and time.

Figure 12:
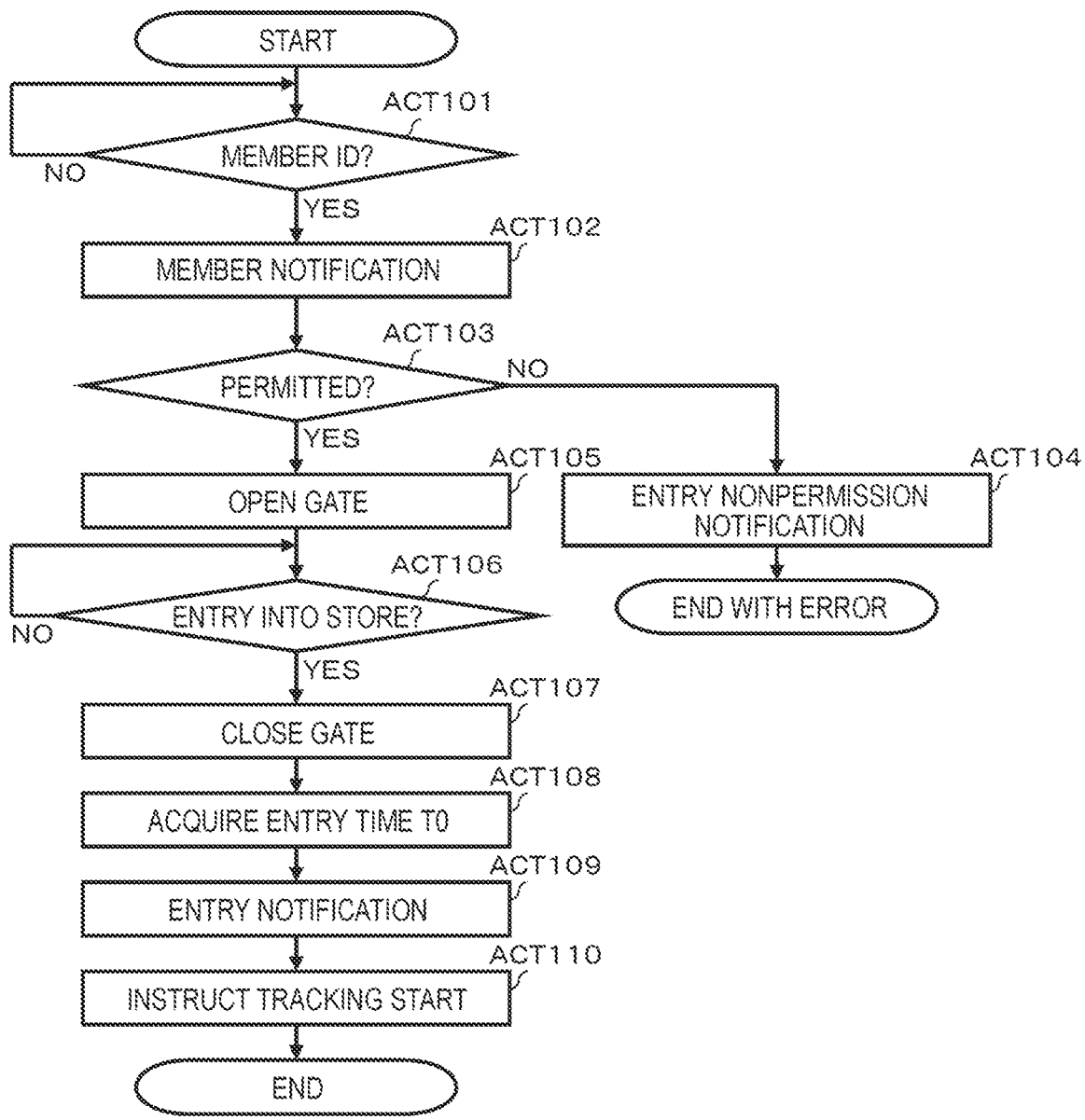
FIG. 12 is a flowchart of a control procedure performed by a control unit of an entrance gate device.
Figure 13:
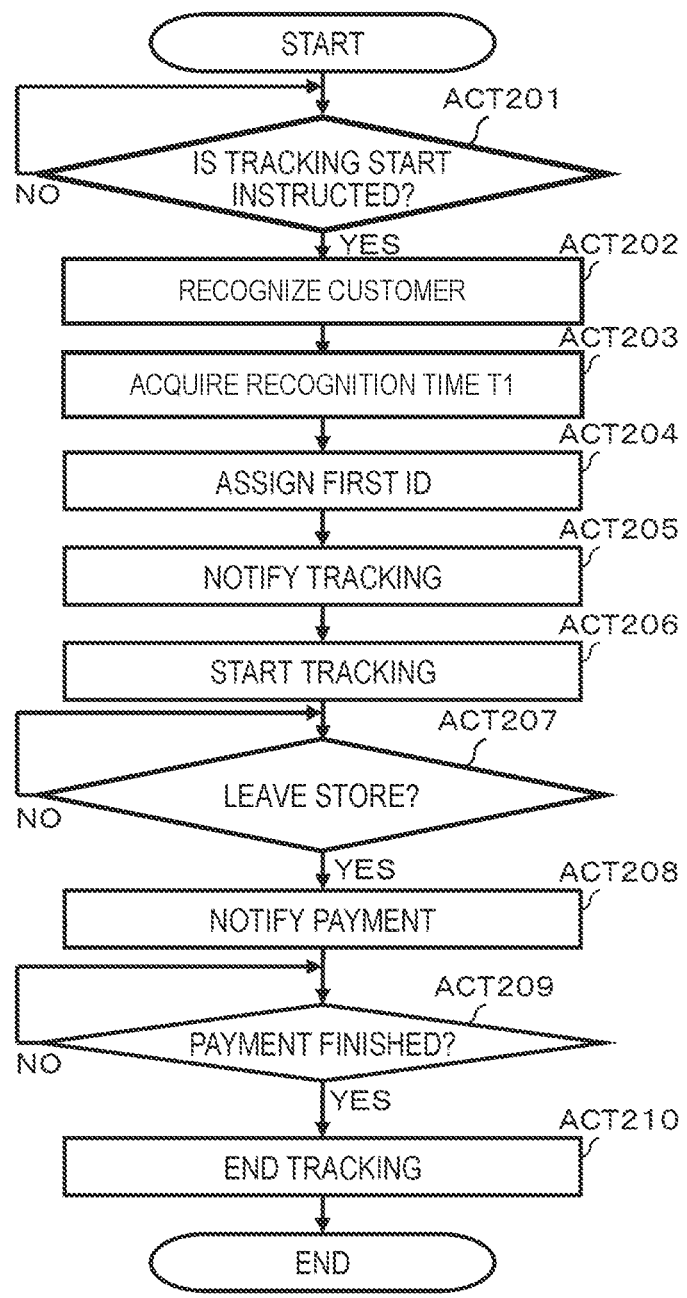
FIG. 13 is a flowchart of a control procedure performed by a control unit of a customer tracking device.
Figure 14:
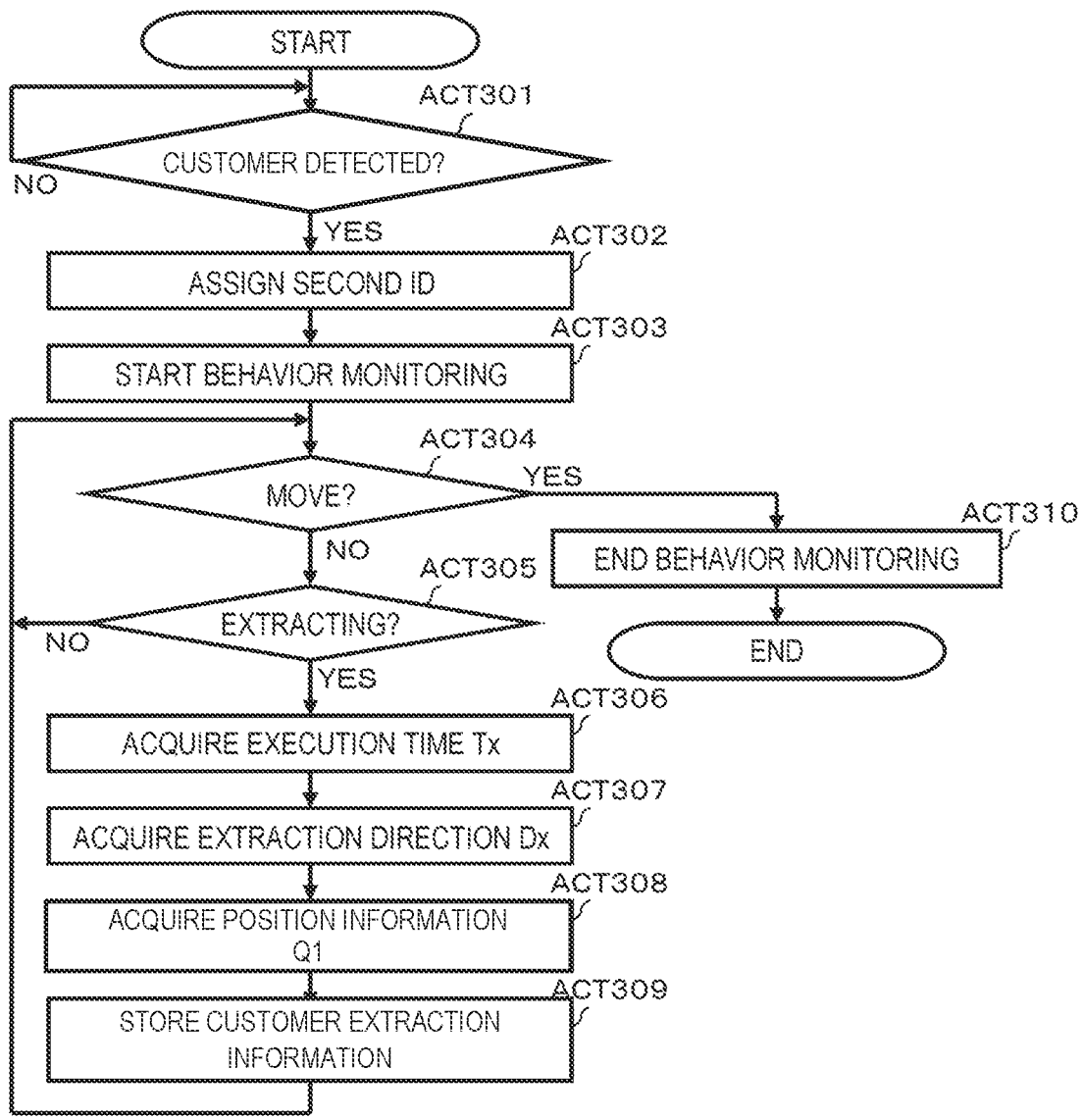
FIG. 14 is a flowchart of a control procedure performed by a control unit of a behavior monitoring device.
Figure 15:
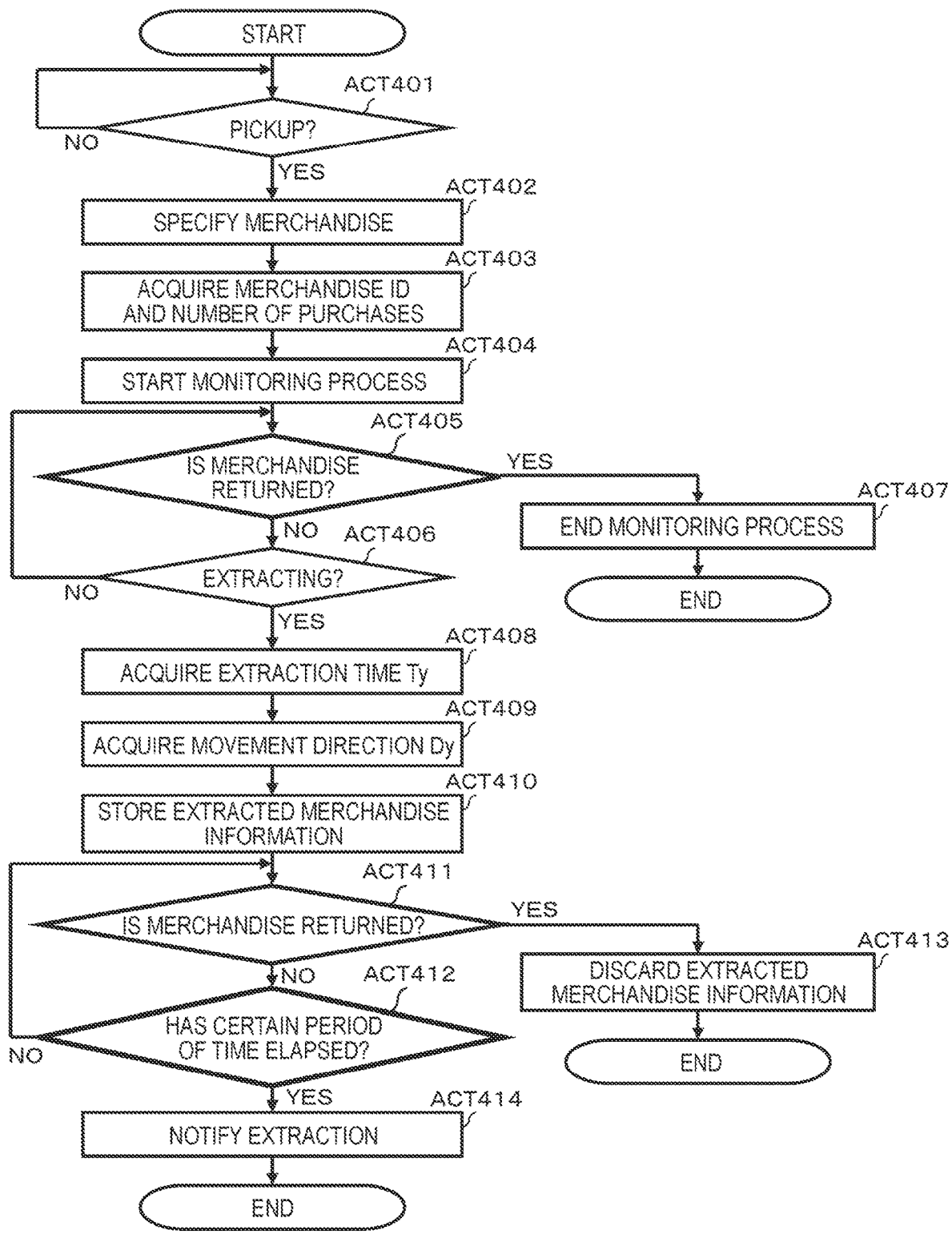
FIG. 15 is a flowchart of a control procedure performed by a control unit of a merchandise monitoring device.
Figure 16:
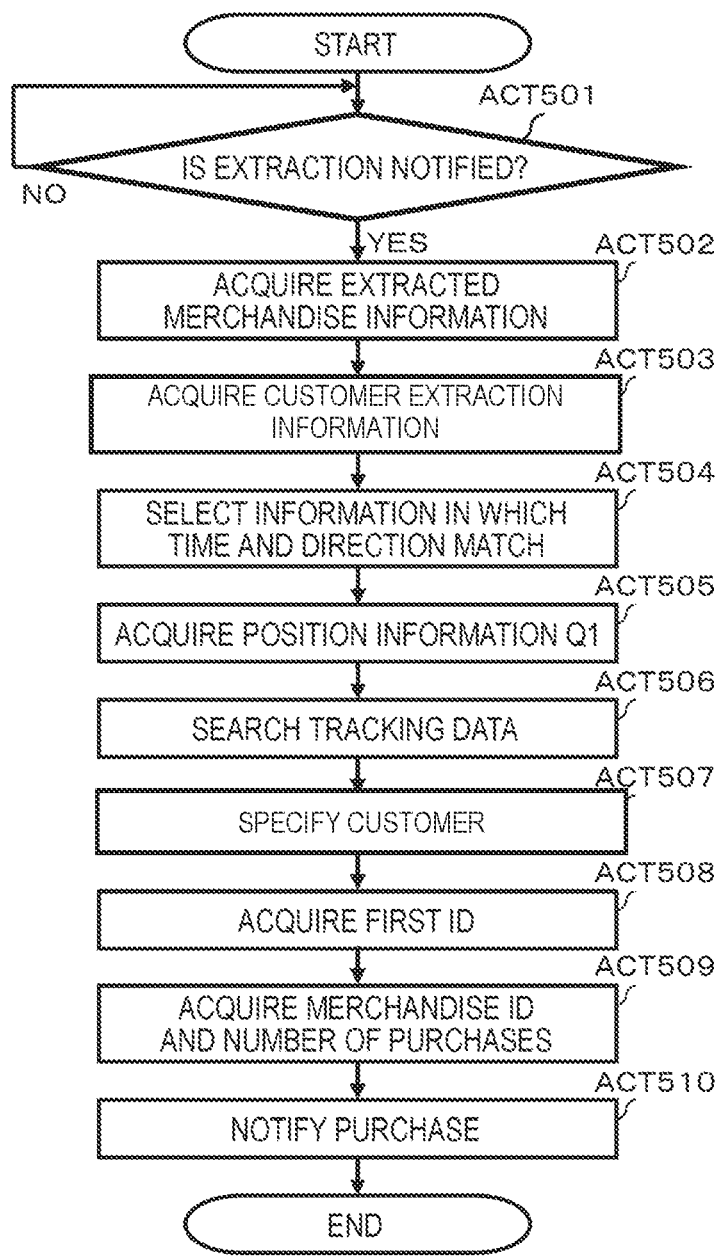
FIG. 16 is a flowchart of a control procedure performed by a control unit of an integrated recognition device.

FIG. 12 is a flowchart of a control procedure performed by the control unit 16 in the entrance gate device 10. FIG. 13 is a flowchart of a control procedure performed by the control unit 26 in the customer tracking device 20. FIG. 14 is a flowchart of a control procedure performed by the control unit 37 in the behavior monitoring device 30. FIG. 15 is a flowchart of a control procedure performed by the control unit 47 in the merchandise monitoring device 40. FIG. 16 is a flowchart of a control procedure performed by the control unit 57 in the integrated recognition device 50. FIGS. 17 to 22 are flowcharts of control procedures performed by the control unit 68 in the sales management device 60. Hereinafter, by using these drawings, the operations of the sales management system 100 are described. According to the description of the operation, the sales management method of the present embodiment is clarified. The procedures and contents of the operation described below are examples. Any alternative procedures may be used as long as same results can be obtained.

First, the control unit 16 of the entrance gate device 10 waits for an input of a member ID in ACT 101 in FIG. 12. When the customer performs a check-in operation on the reception unit 11 at the entrance of the store, the member ID of the customer is input, so the control unit 16 determines YES in ACT 101 and proceeds to ACT 102. The control unit 16 controls the communication unit 14 to notify the sales management device 60 about the member ID. By the control, the communication unit 14 transmit a member notification command to the sales management device 60 via the communication network 70. The member notification command includes the member ID input by the check-in operation.

Figure 17:
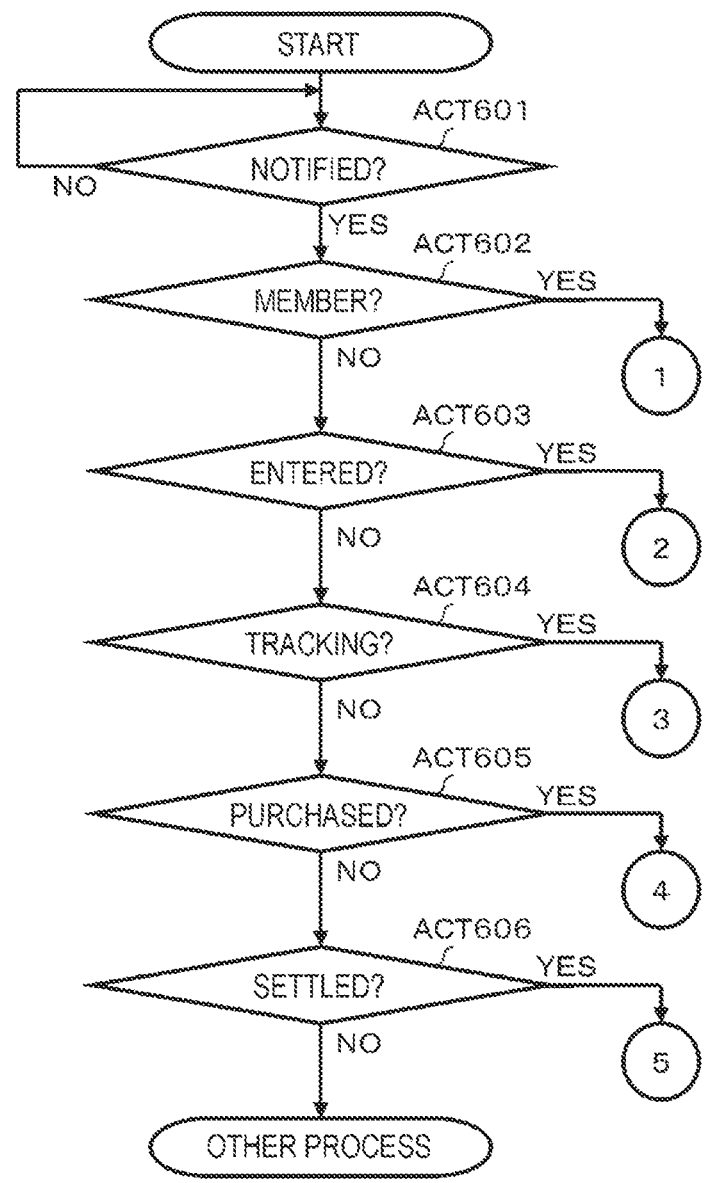
FIGS. 17-22 are flowcharts of control procedures performed by a control unit of s sales management device.
Figure 18:
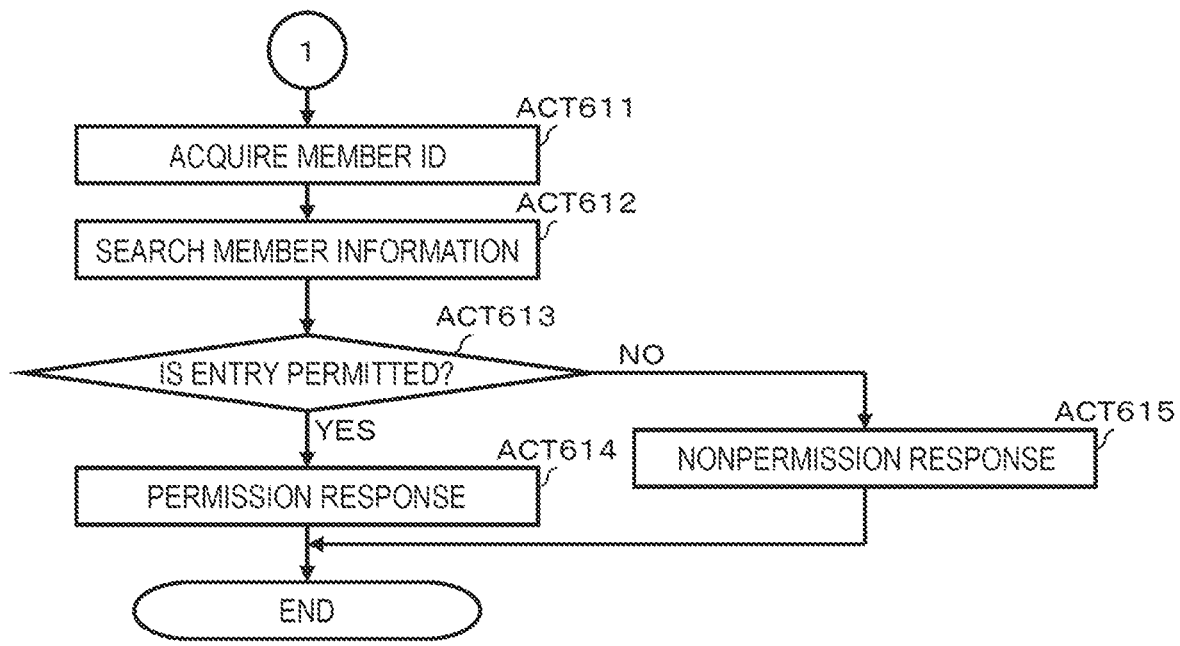
Figure 19:
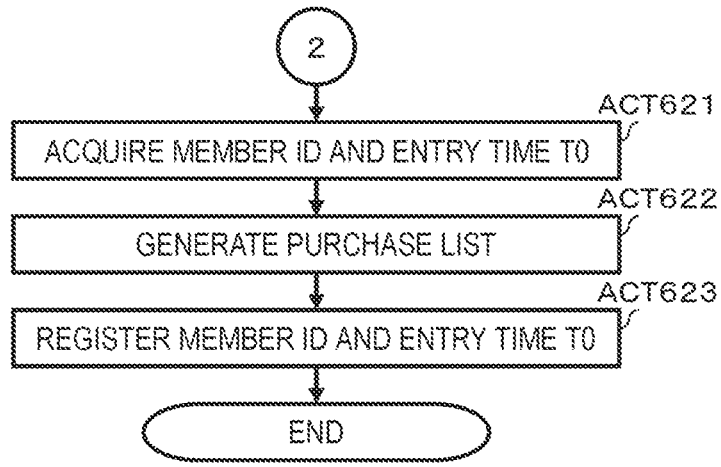
Figure 20:
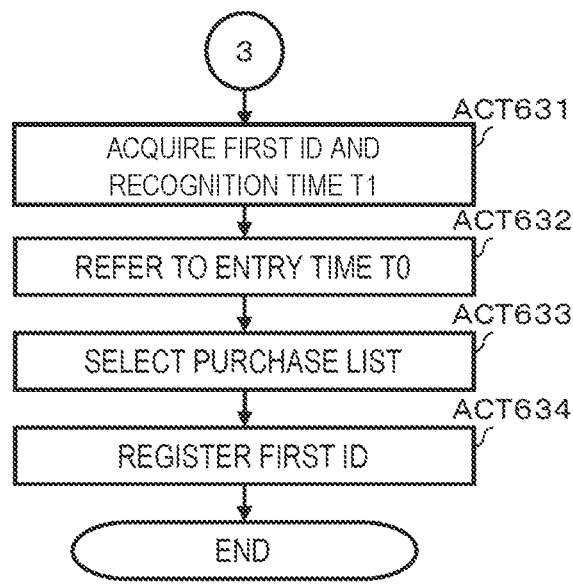

The control unit 68 of the sales management device 60 waits for a notification command in ACT 601 of FIG. 17. When the notification command is received via the communication unit 66, the control unit 68 determines YES in ACT 601 and proceeds to ACT 602. The control unit 68 confirms whether the command received in ACT 602 is the member notification command. In this case, since the member notification command is received, the control unit 68 determines YES in ACT 602 and proceeds to ACT 611 of FIG. 18.

The control unit 68 acquires the member ID from the member notification command in ACT 611. If the member ID is acquired, the control unit 68 searches the member information storage unit 62 with the member ID in ACT 612 and acquires member information correlated with the member ID. The control unit 68 determines whether the entry is permitted in ACT 613. For example, when the member information is not acquired from the member information storage unit 62, the control unit 68 determines the entry is rejected. On the other hand, if the member information is acquired, but a rejection flag is set, the control unit 68 determines the entry is rejected. If the member information in which a rejection flag is not set is acquired, the control unit 68 determines the entry is permitted.

In a case where the entry is permitted, the control unit 68 determines YES in ACT 613 and proceeds to ACT 614. The control unit 68 controls the communication unit 66 to reply a permission response in ACT 614. In contrast, in a case where the entry is rejected, the control unit 68 determines NO in ACT 613 and proceeds to ACT 615. The control unit 68 controls the communication unit 66 to reply a rejection response in ACT 615. By the control, a permission response command or a rejection response command is transmitted to the entrance gate device 10 via the communication network 70. Here, the control unit 68 ends reception of the member notification command.

The description refers back to FIG. 12. The control unit 16 of the entrance gate device 10 that controls the transmission of the member notification command waits for the response command from the sales management device 60 in ACT 103. Here, if the rejection response command is received, the control unit 16 determines NO in ACT 103 and proceeds to ACT 104. The control unit 16 controls the reception unit 11 to notify entry rejection in ACT 104. By the control, the reception unit 11 notifies the customer who performs check-in about the entry rejection by display or sound. Here, the control unit 16 ends the information process of procedures presented in the flowchart of FIG. 12.

Meanwhile, the control unit 16 determines YES when the permission response command is received in ACT 103 and proceeds to ACT 105. The control unit 16 controls the opening and closing unit 12 to open the gate in ACT 105. By the control, the opening and closing unit 12 opens the gate. When the gate is open, the customer who performs the check-in can enter the store. When the customer passes through the gate, the sensor of the opening and closing unit 12 detects the entry, and an entry detection signal is output to the control unit 16.

The control unit 16 that controls the opening of the gate waits for the entry detection signal in ACT 106. If the entry detection signal is input, the control unit 16 determines YES in ACT 106 and proceeds to ACT 107. The control unit 16 controls the opening and closing unit 12 to close the gate in ACT 107. By the control, the opening and closing unit 12 closes the gate. When the gate is closed, the entry of the subsequent customer is prevented.

The control unit 16 that controls the closing of the gate acquires the time from the clock unit 13 as the entry time T0 in ACT 108. The control unit 16 controls the communication unit 14 to notify the sales management device 60 about the entry in ACT 109. The control unit 16 controls the communication unit 14 to instruct a tracking start to the customer tracking device 20 in ACT 110. By the control, an entry notification command is transmitted to the sales management device 60 via the communication network 70. The entry notification command includes the member ID input to the reception unit 11 by the check-in operation and the entry time T0. The communication unit 14 transmits a tracking start command to the customer tracking device 20 via the communication network 70. The tracking monitoring command includes the entry time T0.

The control unit 68 of the sales management device 60 detects the reception of the notification command in ACT

601 of FIG. 17. When it is confirmed that the notification command is not a member notification command in ACT 602, the control unit 68 determines NO and proceeds to ACT 603. The control unit 68 confirms whether the notification command is the entry notification command in ACT 603. In this case, since the entry notification command is received, the control unit 68 determines YES in ACT 603 and proceeds to ACT 621 of FIG. 19.

The control unit 68 acquires the member ID and the entry time T0 from the entry notification command in ACT 621. The control unit 68 controls the purchase list generation unit 63 in ACT 622 and generates the purchase list 600 in the storage unit 67. The control unit 68 control the purchase list update unit 64 in ACT 623 and registers the member ID and the entry time T0 acquired from the entry notification command to the purchase list 600. Here, the control unit 68 ends the reception of the entry notification command.

Meanwhile, the control unit 26 of the customer tracking device 20 waits for the tracking start command in ACT 201, as illustrated in FIG. 13. When the tracking start command is received via the communication unit 24, the control unit 26 determines YES in ACT 201 and proceeds to ACT 202. The control unit 26 recognizes the customer who passes through the entrance gate as a customer of which a new check-in is approved based on the position information of each customer which is detected by the detection unit 21 in ACT 202. The control unit 26 acquires time from the clock unit 23 in ACT 203 as a recognition time T1 of the customer. The control unit 26 assigns a unique first ID to the customer in ACT 204.

In this manner, when a customer of which the check-in is approved and who enters the store is recognized and the unique first ID is assigned to the customer, the control unit 26 controls the communication unit 14 to notify the sales management device 60 of the start of tracking in ACT 205. By the control, a tracking notification command is transmitted to the sales management device 60 via the communication network 70. The tracking notification command includes the recognition time T1 and the first ID for the customer by which the check-in is approved.

When the reception of the notification command is detected in ACT 601 of FIG. 17 and it is confirmed that the notification command is not the entry notification command in ACT 603, the control unit 68 of the sales management device 60 determines NO and proceeds to ACT 604. The control unit 68 confirms whether the notification command is the tracking notification command in ACT 604. In this case, since the tracking notification command is received, the control unit 68 determines YES in ACT 604 and proceeds to ACT 631 of FIG. 20.

The control unit 68 acquires the first ID and the recognition time T1 from the tracking notification command in ACT 631. The control unit 68 refers to the entry time T0 of each purchase list stored in the storage unit 67 in ACT 632. The control unit 68 selects the purchase list 600 in which the newest entry time T0 is registered in the recognition time T1 in ACT 633. The control unit 68 controls the purchase list update unit 64 in ACT 634 and registers the first ID acquired from the tracking notification command to the selected purchase list 600. In the above, the control unit 68 ends the reception of the tracking notification command.

The description refers back to FIG. 13. The control unit 26 of the customer tracking device 20 that has notified the start of tracking instructs the tracking unit 22 to start tracking of the customer in ACT 206. By the instruction, the tracking unit 22 collects and stores the tracking data including position information correlated with the first ID of the customer and the detected date and time.

The control unit 26 waits for the leaving of the customer who is tracked in ACT 207. For example, when the exit of the store is located separately from the entrance, if the tracking unit 22 confirms that the customer passes through the exit, the control unit 26 determines that the customer leaves the store. For example, when the entrance and the exit share a gate, if the tracking unit 22 confirms that the customer passes through the gate, the control unit 26 determines that the customer leaves the store.

When detecting that the customer leaves the store, the control unit 26 determines YES in ACT 207 and proceeds to ACT 208. The control unit 26 controls the communication unit 24 to notify the sales management device 60 of the start of payment in ACT 208. By the control, a payment notification command is transmitted to the sales management device 60 via the communication network 70. The payment notification command includes the first ID assigned to the customer whose leaving is detected. An operation of the control unit 68 of the sales management device 60 that receives the payment notification command is described below. Subsequent operations of the control unit 26 that has notified the start of payment are also described below.

The control unit 37 of the behavior monitoring device 30 waits for the detection of the customer CA1 by the customer detection unit 31 in ACT 301 of FIG. 14. When the customer CA1 is detected, the control unit 37 determines YES in ACT 301 and proceeds to ACT 302. The control unit 37 assigns a unique second ID to the customer CA1 in ACT 302. The control unit 37 controls the behavior determination unit 32 and the extraction direction specifying unit 33 to start the behavior monitoring of the customer CA1 in ACT 303. By this control, the behavior determination unit 32 and the extraction direction specifying unit 33 monitor the behavior of the customer CA1.

The control unit 37 confirms whether the customer detection unit 31 determines that the customer CA1 moves out of the monitoring target area AR1 in ACT 304. When the customer CA1 is present in the monitoring target area AR1, the control unit 37 determines NO in ACT 304 and proceeds to ACT 305. The control unit 37 confirms whether the behavior determination unit 32 determines that the customer CA1 performs a behavior of grasping and extracting a displayed merchandise in ACT 305. When the customer CA1 does not perform such a behavior, the control unit 37 determines NO in ACT 305 and returns to ACT 304. Here, in ACT 304 or ACT 305, the control unit 37 waits for the movement of the customer CA1 out of the monitoring target area AR1 or a behavior of grasping and extracting a displayed merchandise by the customer CA1.

In the waiting state of ACT 304 or ACT 305, if the customer CA1 performs the behavior of grasping and extracting a displayed merchandise, the control unit 37 determines YES in ACT 305 and proceeds to ACT 306. The control unit 37 acquires time from the clock unit 34 as an execution time Tx in ACT 306. The control unit 37 acquires an extraction direction Dx of the merchandise specified by the extraction direction specifying unit 33 in ACT 307. The control unit 37 acquires position information Q1 of the customer CA1 detected by the customer detection unit 31 in ACT 308. The control unit 37 generates customer extraction information including the second ID, the execution time Tx, the extraction direction Dx, and the position information Q1 and stores the customer extraction information in the storage unit 36 in ACT 309. Thereafter, the control unit 37 returns to a waiting state of ACT 304 or ACT 305.

In the waiting state of ACT 304 or ACT 305, when the customer CA1 moves out of the monitoring target area AR1, the control unit 37 determines YES in ACT 304 and proceeds to ACT 310. The control unit 37 controls the behavior determination unit 32 and the extraction direction specifying unit 33 to end the behavior monitoring of the customer CA1 to which the second ID is assigned in ACT 310. Here, the control unit 37 ends the information process of the procedures presented by the flowchart of FIG. 14.

In ACT 401 of FIG. 15, the control unit 47 of the merchandise monitoring device 40 waits for the detection of the pickup of the merchandise by the movement monitoring unit 41. For example, when it is confirmed that the pickup of the merchandise is detected by the reduction of the measured weight by the weight sensors 84, i.e., at the timing t2 of FIG. 8, the control unit 47 waits for specifying of the merchandise by the merchandise specifying unit 42 in ACT 402. If the merchandise is specified by the reduction of the measured weight by the integer multiple of the unit weight of the merchandise, i.e., at the timing t3 of FIG. 8, the control unit 47 acquires the merchandise ID of the merchandise and the number of purchases in ACT 403. For example, the storage unit 46 stores a data table in which the weight sensors 84 and the merchandise ID of the merchandise displayed in the section in which the weight sensors 84 is disposed correspond to each other, and the control unit 47 acquires the merchandise ID corresponding to the weight sensor from the data table. The control unit 47 divides the reduction of the weight measured by the weight sensor 84 $\Delta W$ (W2−W1) by the unit weight W0 of the merchandise identified by the merchandise ID, and acquires the quotient as the number of purchases.

When the merchandise ID and the number of purchases are acquired, the control unit 47 starts to monitor merchandise movement by the movement monitoring unit 41 and the movement direction specifying unit 43 in ACT 404. The control unit 47 confirms whether the merchandise which is a monitoring target is returned to the original location in ACT 405. For example, when the measured weight of the weight sensors 84 is returned to a state before the change, it is determined that the merchandise which is the monitoring target is returned to the original location. When the merchandise which is the monitoring target is not returned to the original location, the control unit 47 determines NO in ACT 405 and proceeds to ACT 406. The control unit 47 confirms whether the customer extracts the merchandise which is the monitoring target in ACT 406. When the merchandise is not extracted, the control unit 47 determines NO in ACT 406 and returns to ACT 407. Here, the control unit 47 waits for the returning of the picked-up merchandise which is the monitoring target to the original location or the extraction by the customer in ACT 405 or ACT 406.

In the waiting state of ACT 405 or ACT 406, when the merchandise which is the monitoring target is returned to the original location, the control unit 47 determines YES in ACT 405 and proceeds to ACT 407. The control unit 47 ends the monitoring of the merchandise movement by the movement monitoring unit 41 and the movement direction specifying unit 43 in ACT 407. Here, the control unit 47 ends the information process of the procedures presented in the flowchart of FIG. 15.

In the waiting state of ACT 405 or ACT 406, the merchandise which is the monitoring target is extracted by the customer, the control unit 47 determines YES in ACT 406 and proceeds to ACT 408. The control unit 47 acquires time tracked with the clock unit 44 as an extraction time Ty of the merchandise in ACT 408. The control unit 47 acquires a movement direction Dy specified by the movement direction specifying unit 43 in ACT 409. The control unit 47 generates the extracted merchandise information including the merchandise ID, the number of purchases, the extraction time Ty, and the movement direction Dy in ACT 410 and stores the information in the storage unit 46.

Thereafter, the control unit 47 confirms whether the extracted merchandise is returned to the original location in ACT 411. When the merchandise is not returned to the original location, the control unit 47 determines NO in ACT 411 and proceeds to ACT 412. The control unit 47 confirms whether a certain time, for example, 10 seconds have passed from the generation of the extracted merchandise information in ACT 412. When the certain time have not passed, the control unit 47 determines NO in ACT 412 returns to ACT 411. Here, the control unit 47 waits for the passage of the certain time for the returning of the merchandise extracted by the customer to the original location in ACT 411 or ACT 412.

In the waiting state of ACT 411 or ACT 412, when the merchandise extracted by the customer is returned to the original, the control unit 47 determines YES in ACT 411 and proceeds to ACT 413. The control unit 47 discards the extracted merchandise information written in the storage unit 46 in ACT 413. Here, the control unit 47 ends the information process of the procedures presented by the flowchart of FIG. 15.

When the certain time have passed without the returning of the merchandise to the original location, the control unit 47 determines YES in ACT 412 and proceeds to ACT 414. The control unit 47 controls the communication unit 45 to notify the integrated recognition device 50 of the extraction of the merchandise in ACT 414. By the control, an extraction notification command is transmitted to the integrated recognition device 50 via the communication network 70. The extraction notification command includes the extracted merchandise information stored in the storage unit 46.

The control unit 57 of the integrated recognition device 50 waits for the extraction notification in ACT 501 of FIG. 16. If the extraction notification command transmitted from the merchandise monitoring device 40 is received in the communication unit 55, the control unit 57 determines YES in ACT 501 and proceeds to ACT 502. The control unit 57 acquires the extracted merchandise information, that is, the merchandise ID, the number of purchases, the extraction time Ty, and the movement direction Dy from the extraction notification command in ACT 502. The control unit 57 stores the extracted merchandise information in the storage unit 56.

The control unit 57 acquires the customer extraction information, that is, the second ID, the execution time Tx, the extraction direction Dx, and the position information Q1, for example, in an order of the new execution time Tx from the behavior monitoring device 30 for monitoring a behavior of the customer standing in front of the merchandise shelf on which the merchandise monitored by the merchandise monitoring device 40 which is the transmission source of the extraction notification command is displayed in ACT 503. The control unit 57 selects the customer extraction information that satisfies the time condition and the direction condition in ACT 504. Specifically, the control unit 57 calculates the time difference between the extraction time Ty of the extracted merchandise information and the execution time Tx of the customer extraction information. If the time difference falls within an acceptable range, the control unit 57 determines that the extraction time Ty matches the execution time Tx. Similarly, the control unit 57 calculates an angular deviation between the movement direction Dy of the extracted merchandise information and the extraction direction Dx of the customer extraction information. If the angular deviation falls within an acceptable range, the control unit 57 determines whether the movement direction Dy matches the extraction direction Dx.

When the customer extraction information that satisfies the time condition and the direction condition is selected, the control unit 57 acquires the position information Q1 from the customer extraction information in ACT 505. The control unit 57 searches tracking data of each customer stored in the customer tracking device 20 in ACT 506. The control unit 57 specifies the customer standing in the location of the position information Q1 at the execution time Tx of the customer extraction information in ACT 507.

If the customer is specified, the control unit 57 acquires the first ID of the customer from the customer tracking device 20 in ACT 508. The control unit 57 acquires the merchandise ID and the number of purchases from the extracted merchandise information in ACT 509. The control unit 57 controls the communication unit 14 to notify the sales management device 60 of the purchase in ACT 510. By the control, a purchase notification command is transmitted to the sales management device 60 via the communication network 70. The purchase notification command includes the first ID, the merchandise ID, and the number of purchases. Here, the control unit 57 ends the information process of the procedures presented in the flowchart of FIG. 16.

When the reception of the notification command is detected in ACT 601 of FIG. 17 and it is confirmed that the notification command is not the tracking notification command in ACT 604, the control unit 68 of the sales management device 60 determines NO and proceeds to ACT 605. The control unit 68 confirms whether the notification command is the purchase notification command in ACT 605. In this case, since the purchase notification command is received, the control unit 68 determines YES in ACT 605 and proceeds to ACT 641 of FIG. 21.

The control unit 68 acquires the first ID, the merchandise ID, and the number of purchases from the purchase notification command in ACT 641. The control unit 68 selects the purchase list 600 in which the first ID is registered in ACT 642. The control unit 68 registers the merchandise ID and the number of purchases to the purchase list 600 in ACT 643. Here, the control unit 68 ends the reception of the purchase notification command.

When the reception of the notification command is detected in ACT 601 of FIG. 17 and it is confirmed that the notification command is not the purchase notification command in ACT 605, the control unit 68 of the sales management device 60 determines NO and proceeds to ACT 606. The control unit 68 confirms whether the notification command is the payment notification command in ACT 606. When the payment notification command is received, the control unit 68 determines YES in ACT 606 and proceeds to ACT 651 of FIG. 22.

As described above, the payment notification command output from the customer tracking device 20 to the sales management device 60 includes the first ID. The control unit 68 acquires the first ID from the payment notification command in ACT 651. The control unit 68 selects the purchase list 600 in which the first ID is registered in ACT 652. The control unit 68 registers the member ID from the purchase list 600 in ACT 653.

The control unit 68 searches the member information storage unit 62 with the member ID in ACT 654. The control unit 68 acquires the information of a payment account stored in correlation with the member ID. The control unit 68 searches the merchandise information stored in the merchandise information storage unit 61 with the merchandise ID registered in the purchase list 600 and acquires a price for each merchandise ID in ACT 655. The control unit 68 calculates a payment amount from the prices and the number of purchases.

The control unit 68 performs payment for withdrawing the payment amount from the payment account in ACT 656. In the payment, the control unit 68 generates an electronic receipt and enables the electronic receipt to be downloaded to a smartphone or the like of the customer.

When the payment ends, the control unit 68 controls the communication unit 66 to notify the customer tracking device 20 of the end of the payment in ACT 657. By this control, a payment end command is transmitted from the communication unit 66 to the customer tracking device 20 via the communication network 70. The payment end command includes the first ID registered in the purchase list 600 with which the payment is performed. Here, the control unit 68 ends the reception of the payment notification command.

The description refers back to FIG. 13. The control unit 26 of the customer tracking device 20 that controls the transmission of the payment notification command in ACT 208 waits for the payment end command in ACT 209. If the reception of the payment end command is detected via the communication unit 24, the control unit 26 determines YES in ACT 209 and proceeds to ACT 210. The control unit 26 acquires the first ID from the payment end command in ACT 210. The control unit 26 ends the collection and storage of tracking data of the tracked customer to which the first ID is assigned in ACT 211. Here, the control unit 26 ends the information process of the procedure presented in the flowchart of FIG. 13.

As clarified in the above description, in the sales management system 100, the control unit 37 of the behavior monitoring device 30 controls the customer detection unit 31 and detects the customer facing the displayed merchandise by performing processes of ACT 301 and ACT 302 of FIG. 14. The control unit 37 recognizes a behavior of extracting a merchandise and the extraction direction thereof by controlling the behavior determination unit 32 and the extraction direction specifying unit 33 and performing the processes of ACT 303 to ACT 310 of FIG. 14.

The control unit 47 recognizes the movement of the displayed merchandise and the movement direction of the merchandise by controlling the movement monitoring unit 41, the merchandise specifying unit 42, and the movement direction specifying unit 43 and performing processes of ACT 401 to ACT 414 of FIG. 15.

The control unit 57 matches the extraction direction of the merchandise moved by the customer detected by the behavior monitoring device 30 and the movement direction of the merchandise detected by the merchandise monitoring device 40 by controlling the merchandise monitoring acquisition unit 51, the behavior monitoring acquisition unit 52, the matching unit 53, and the purchase specifying unit 54 and performing processes of ACT 501 to ACT 510 of FIG. 16. When the extraction direction of the merchandise detected by the behavior monitoring device 30 is substantially identical with the movement direction of the merchandise detected by the merchandise monitoring device 40, the control unit 57 specifies the moved merchandise as a merchandise to be purchased by the customer.

Figure 21:
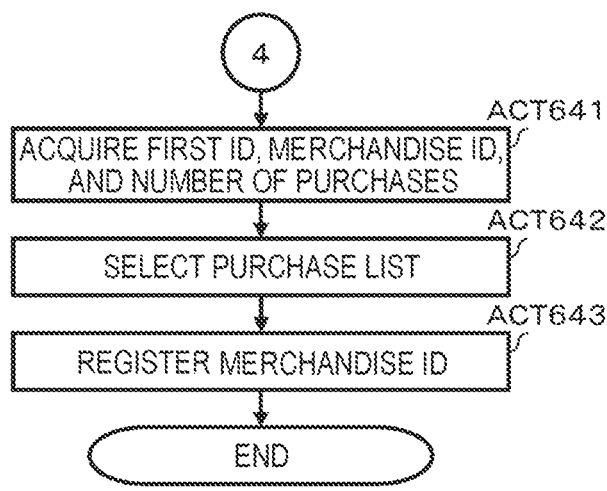
Figure 22:
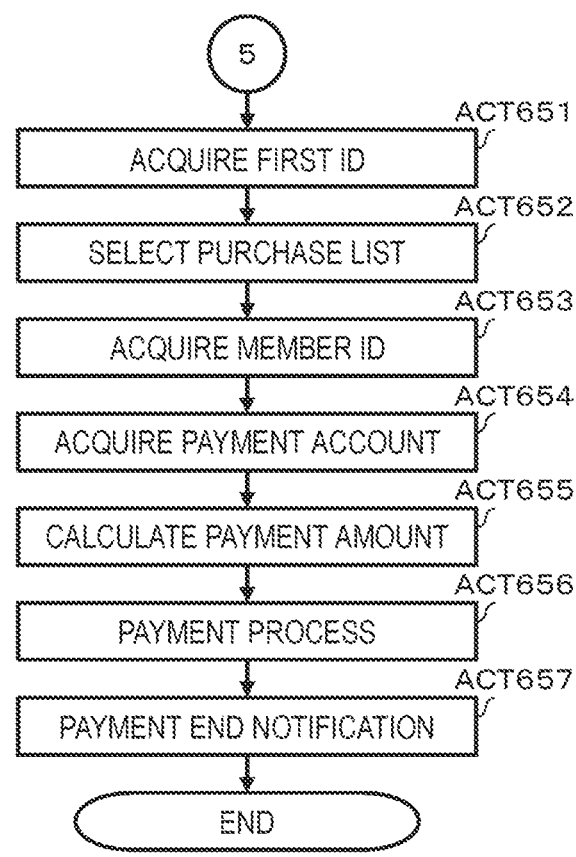

The control unit 68 of the sales management device 60 registers the specified purchase merchandise of the customer to the purchase list 600 by controlling the purchase list update unit 64 and performing processes of ACT 641 to ACT 643 of FIG. 21.

The control unit 37 of the behavior monitoring device 30 acquires the execution time Tx which is a first time at which a behavior of extracting a merchandise is recognized by performing a process of ACT 306 of FIG. 14. The control unit 47 of the merchandise monitoring device 40 acquires the extraction time Ty which is a second time at which the movement of the merchandise is recognized by performing a process of ACT 408 of FIG. 15. However, when the movement direction of the merchandise of which the movement is recognized at the extraction time Ty substantially matches the extraction direction of the extracting behavior of the customer recognized at the execution time Tx, the control unit 57 of the integrated recognition device 50 specifies the moved merchandise as a merchandise to be purchased by the customer.

The control unit 16 of the entrance gate device 10 identifies the customer by controlling the reception unit 11 and the opening and closing unit 12 and performing processes of ACT 101 to 110 of FIG. 12. The control unit 26 of the customer tracking device 20 tracks the customer in the store by controlling the detection unit 21 and the tracking unit 22 and performing processes of ACT 201 to ACT 210 of FIG. 13. The control unit 57 of the integrated recognition device 50 identifies the customer by controlling the purchase specifying unit 54 and performing processes of ACT 505 to ACT 507. That is, the control unit 57 specifies the customer detected by the detection unit 21 based on the results obtained by identifying the customer using identifying information from the entrance gate device 10 and tracking the customer using the customer tracking device 20. The control unit 68 of the sales management device 60 registers the purchased merchandise in the purchase list generated for each customer specified by the integrated recognition device 50.

According to the above configuration, for example, it is assumed that two customers CA1 and CA2 are separately standing on the left and the right in the monitoring target area AR1 of the merchandise shelf 80 illustrated in FIG. 6, each extends his or her arm to a merchandise AAA displayed in the central section on the second stage of a display shelf, the customer CA1 standing on the left side toward the merchandise shelf 80 withdraws his or her arm without taking the merchandise AAA, and the customer CA2 standing on the right side withdraws his or her arm with taking the merchandise AAA. In this case, in the behavior monitoring device 30, a behavior of extracting the merchandise to the customer CA1 and the customer CA2 and the extraction direction thereof are recognized. Meanwhile, in the merchandise monitoring device 40, the movement of the merchandise AAA and the movement direction thereof are recognized. In this case, the movement direction of the merchandise AAA is identical to the extraction direction by the customer CA2, and thus the customer CA2 is specified as the purchaser of the merchandise AAA in the integrated recognition device 50.

It is assumed that when the customer CA2 extracts the merchandise AAA, almost at the same time, another customer CA3 behind the customer CA2 extracts a merchandise BBB from another section. In this case, the behavior monitoring device 30 recognizes behaviors of extracting the merchandises by the customer CA2 and the customer CA3 and extraction directions thereof. Meanwhile, the merchandise monitoring device 40 recognizes movements of the merchandise AAA and the merchandise BBB and movement directions thereof. In this case, the movement direction of the merchandise AAA is identical to the extraction direction by the customer CA2, and thus the integrated recognition device 50 specifies the customer CA2 as the purchaser of the merchandise AAA. The movement direction of the merchandise BBB is identical to the extraction direction by the customer CA3, and thus the integrated recognition device 50 specifies the customer CA3 as the purchaser of the merchandise BBB.

It is assumed that, after the customer CA1 extracts the merchandise AAA, the customer CA3 extracts a merchandise CCC from the same section as the merchandise AAA. In this case, the movement directions of the merchandise AAA and the merchandise CCC are almost identical to the extraction directions by the customer CA2 and the customer CA3. However, there is a time difference ΔTx between an execution time Tx1 at which the behavior of extracting the merchandise AAA by the customer CA2 is recognized and an execution time Tx2 at which the behavior of extracting the merchandise CCC by the costumer CA3 is recognized. Similarly, there is a time difference ΔTy between an extraction time Ty1 at which the extraction of the merchandise AAA is recognized and an extraction time Ty2 at which the extraction of the merchandise CCC is recognized. Thus, it is considered that the execution time Tx1 matches the extraction time Ty1 and the execution time Tx2 matches the extraction time Ty2. Accordingly, the integrated recognition device 50 specifies the customer CA2 as the purchaser of the merchandise AAA, and specifies the customer CA3 as the purchaser of the merchandise CCC.

Therefore, the sales management system 100 can correctly identify which customer is taking which merchandise.

For example, when the weight sensors 84 are used as sensors for the movement monitoring unit 41 and the merchandise specifying unit 42 in the merchandise monitoring device 40, not only the kind of the merchandise extracted from the merchandise shelf 80 but also the number of merchandise items taken can be specified. Therefore, the sales management device 60 can register the number of purchases together with the merchandise ID, which is an identification code of the merchandise specified as the purchase merchandise.

It is not necessary to use a weight sensor in all possible embodiments. For example, in some embodiments, an image captured by a camera may be analyzed to obtain the number of merchandise items extracted from the merchandise shelf 80. In some examples, if the total number of merchandise items that can be extracted from the merchandise shelf 80 by the customer is limited to just one, there may be no particular need to determine the number of merchandise items taken from the merchandise shelf 80.

In ACT 504 of FIG. 16, when the movement direction of the merchandise of which movement is recognized at the extraction time Ty matches the extraction direction of the extracting behavior of a customer recognized at the execution time Tx that is within a certain range from the extraction time Ty, the control unit 57 of the integrated recognition device 50 specifies the merchandise as the merchandise to be purchased by the customer. Here, until the behavior determination unit 32 and the extraction direction specifying unit 33 of the behavior monitoring device 30 determine the behavior of the customer, there is a delay from the actual behavior. Similarly, until the movement monitoring unit 41, the merchandise specifying unit 42, and the movement direction specifying unit 43 of the merchandise monitoring device 40 determine the movement of the merchandise, there is a delay from the actual movement. The control unit 57 of the integrated recognition device 50 determines whether the directions are identical in consideration of these delays, to obtain a more reliable result.

As described above, certain example embodiments of a sales management system and a sales management method capable of correctly specifying the customer taking merchandise from a display or the like are described, but the present disclosure is not limited thereto.

For example, in the above embodiments, a case where payment is performed by withdrawing the payment amount from the payment account is exemplified. But methods of payment are not limited thereto. For example, the payment may be performed by any known method, such as a credit card payment, a coded payment using a barcode, a two-dimensional code, or the like.

In the example embodiments, a case where the customer CA2 extracts the merchandise from the merchandise shelf 80 is exemplified. In this regard, the movement monitoring unit 41, the merchandise specifying unit 42 and the movement direction specifying unit 43 of the merchandise monitoring device 40 can also detect the behavior of returning the merchandise once extracted by the customer to the merchandise shelf 80. When the merchandise is returned to the merchandise shelf 80, the merchandise and the customer are specified by the merchandise monitoring acquisition unit 51, the behavior monitoring acquisition unit 52, the matching unit 53, and the purchase specifying unit 54 of the integrated recognition device 50 and notified to the sales management device 60. Upon reception of this notification, the control unit 68 of the sales management device 60 deletes the data of the merchandise from the purchase list 600 of the customer. Accordingly, it is possible to deal with the return of the merchandise before payment is executed by the customer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sales management system, comprising:
a plurality of cameras installed in a store and including first and second cameras;
a first device configured to:
acquire from the first camera a first image of a target location at which a merchandise display is located,
detect from the first image a customer moving an item from the display, and
determine an extraction direction in which the customer moved the item away from the display;
a second device configured to:
acquire from the second camera a second image of the display,
detect movement of the item from the second image, and
determine a movement direction of the item; and
a third device configured to:
determine whether a first difference between the determined extraction and movement directions is within a first range, when a second difference between a first time at which the first device has detected the customer moving the item away from the display and a second time at which the second device has detected the movement of the item is within a second range, and
determine the item as a first item to be purchased by the customer when the first difference is determined to be within the first range.

2. The sales management system according to claim 1, further comprising:
a fourth device configured to perform a registration process on the first item.

3. The sales management system according to claim 1, wherein the first device is further configured to acquire the first time from a first clock, and the second device is further configured to acquire the second time from a second clock.

4. The sales management system according to claim 1, further comprising:
a fifth device configured to identify the customer at an entrance of the store.

5. The sales management system according to claim 4, further comprising:
a sixth device configured to monitor a location in the store of the customer identified by the fifth device.

6. The sales management system according to claim 5, wherein the first device is further configured to identify the customer moving the item away from the display based on the location monitored by the sixth device.

7. The sales management system according to claim 1, wherein the second device is further configured to detect a total number of items moved at once based on a change in weight on the display on which the items are displayed.

8. The sales management system according to claim 1, wherein the first camera is installed above the display.

9. The sales management system according to claim 1, wherein the second camera is installed on the display.

10. The sales management system according to claim 1, wherein the display is a shelf including two or more sections, and the second camera is installed in one of the sections.

11. A sales management method, comprising:
acquiring, from a first camera installed in a store, a first image of a target location at which a merchandise display is located;
detecting from the first image a customer moving an item from the display at a first time and determining an extraction direction in which the customer moved the item away from the display;
acquiring, from a second camera installed in the store, a second image of the display;
detecting movement of the item from the second image at a second time and determining a movement direction of the item;
determining whether a first difference between the determined extraction and movement directions is within a first range, when a second difference between the first and second times is within a second range; and
determining the item as a first item to be purchased by the customer when the first difference is determined to be within the first range.

12. The method according to claim 11, further comprising:
performing a registration process on the first item.

13. The method according to claim 11, wherein
detecting the customer further includes acquiring the first time from a first clock, and detecting the movement of the item further includes acquiring the second time from a second clock that is different from the first clock.

14. The method according to claim 11, further comprising:
identifying the customer at an entrance of the store.

15. The method according to claim 14, further comprising:
monitoring a location of the identified customer in the store.

16. The method according to claim 15, wherein the customer moving the item away from the display is identified based on the monitored location.

17. The method according to claim 11, further comprising:
detecting a total number of items moved at once based on a change in weight on the display on which the items are displayed.

18. The method according to claim 11, wherein the first camera is installed above the display.

19. The method according to claim 11, wherein the second camera is installed on the display.

20. A sales management system, comprising:
a first detection unit for:
  acquiring, from a first camera installed in a store, a first image of a target location at which a merchandise display is located,
  detecting from the first image a customer moving an item from the display, and
  determining an extraction direction in which the customer moved the item away from the display;
a second detection unit for:
  acquiring, from a second camera installed in the store, a second image of the display,
  detecting movement of the item from the second image, and
  determining a movement direction of the item; and
a determination unit for:
  determining whether a first difference between the determined extraction and movement directions is within a first range, when a second difference between a first time at which the first device has detected the customer moving the item away from the display and a second time at which the second device has detected the movement of the item is within a second range, and
  determining the item as a first item to be purchased by the customer when the first difference is determined to be within the first range.

* * * * *